United States Patent
Nazarian et al.

(10) Patent No.: US 6,310,742 B1
(45) Date of Patent: Oct. 30, 2001

(54) REPEATABLE RUNOUT CANCELLATION IN SECTORED SERVO DISK DRIVE POSITIONING SYSTEM

(75) Inventors: Ara W. Nazarian, Tustin, CA (US); Charles W. Simmons, Phoenix, AZ (US); Thao P. Trieu, Redwood City; Richard K. Wong, San Jose, both of CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/603,809

(22) Filed: Jun. 26, 2000

Related U.S. Application Data

(62) Division of application No. 08/946,805, filed on Oct. 8, 1997, now Pat. No. 6,141,175.

(51) Int. Cl.⁷ .................................................. G11B 5/596
(52) U.S. Cl. ............................................................. 360/77.04
(58) Field of Search .......................................... 360/77.04

(56) References Cited

U.S. PATENT DOCUMENTS

| | | | |
|---|---|---|---|
| 5,923,491 | * 7/1999 | Kisaka et al. ............... | 360/77.04 |
| 5,978,169 | * 11/1999 | Woods ........................ | 360/77.04 |
| 6,049,440 | * 4/2000 | Shu ............................ | 360/77.04 |
| 6,097,565 | * 8/2000 | Sri-Jayantha et al. ..... | 360/78.09 |
| 6,115,203 | * 9/2000 | Ho et al. ..................... | 360/77.04 |

\* cited by examiner

*Primary Examiner*—David Hudspeth
*Assistant Examiner*—Dan I Davidson
(74) *Attorney, Agent, or Firm*—Milad G Shara

(57) ABSTRACT

A method in a magnetic storage disk drive for independently learning and thereafter canceling repeatable runout that is written to the servo fields of each servo track during the servo writing process. The method does not require a servo writer because the disk drive may independently detect the runout without spinning out of control in response to such runout by operating its servo control loop in a low bandwidth mode so that it is less responsive to the higher frequency components of the runout, and by removing the effect of the DC component of the runout or selected harmonics on each revolution.

The method takes several revolutions to "learn" the servo wedges of a current track by initializing a wedge runout value for each servo wedge and an average uncorrected runout value and then successively developing an interim wedge runout estimate for each servo wedge by adding a fractional portion λ of a raw position error signal to a fractional portion (1−λ) of the wedge runout value, computing a corrected position error signal by subtracting the interim wedge runout estimate from the raw position error signal, and computing a new wedge runout value by subtracting the average uncorrected runout value from the interim wedge runout estimate and, subsequent to each revolution, updating the average uncorrected runout value.

8 Claims, 20 Drawing Sheets

WRITTEN SERVO TRACKS

IDEAL SERVO TRACKS

RRO SAVING ARRANGEMENT ON DISK FOR THE LEARNED TRACK

SIMULINK MODEL OF THE REPETITIVE CONTROLLER

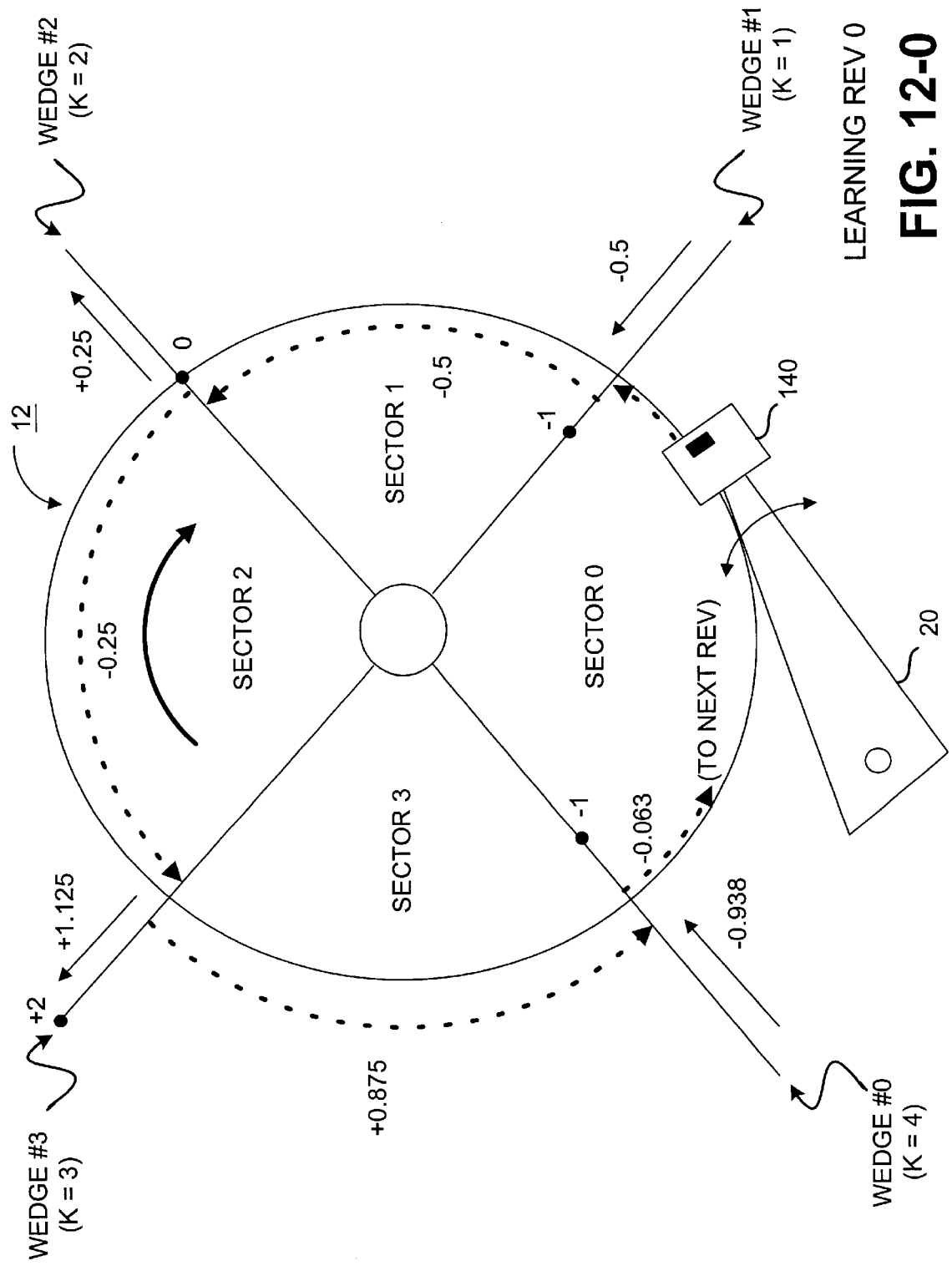
FIG. 12-0 LEARNING REV 0

| λ | | | | | | Step 311 | Step 312 | Step 313 | | | Actual R Wedge #0 | -1 |
|---|---|---|---|---|---|---|---|---|---|---|---|---|
| 0.5 | | | Head | Actual | | Raw | wedge runout | Corrected | | | Step 316 | Values in Wedge #0 |
| Sample (k) | Wedge | Position | RRO | | PosErr'(k) | r(k) | PosErr(k) | RRODC | RROSum | | 0 |
| Rev0 | 1 | 1 | 0.000 | -1 | -1.000 | -0.500 | -0.500 | 0.000 | -0.500 | | |
| | 2 | 2 | -0.500 | 0 | 0.500 | 0.250 | 0.250 | 0.000 | -0.250 | | |
| | 3 | 3 | -0.250 | 2 | 2.250 | 1.125 | 1.125 | 0.000 | 0.875 | | |
| | 4 | 0 | 0.875 | -1 | -1.875 | -0.938 | -0.938 | 0.000 | -0.938 | | |
| Rev1 | 5 | 1 | -0.063 | -1 | -0.938 | -0.719 | -0.219 | -0.016 | -0.703 | | |
| | 6 | 2 | -0.281 | 0 | 0.281 | 0.266 | 0.016 | -0.016 | -0.422 | | |
| | 7 | 3 | -0.266 | 2 | 2.266 | 1.695 | 0.570 | -0.016 | 1.289 | | |
| | 8 | 0 | 0.305 | -1 | -1.305 | -1.121 | -0.184 | -0.016 | 0.184 | | -1.105 |
| Rev2 | 9 | 1 | 0.121 | -1 | -1.121 | -0.912 | -0.209 | 0.046 | -0.958 | | -1.105 |
| | 10 | 2 | -0.088 | 0 | 0.088 | 0.185 | -0.097 | 0.046 | -0.819 | | -1.105 |
| | 11 | 3 | -0.185 | 2 | 2.185 | 1.948 | 0.237 | 0.046 | 1.083 | | -1.105 |
| | 12 | 0 | 0.052 | -1 | -1.052 | -1.079 | 0.027 | 0.046 | -0.042 | | -1.125 |
| Rev3 | 13 | 1 | 0.079 | -1 | -1.079 | -1.018 | -0.060 | -0.011 | -1.008 | | -1.125 |
| | 14 | 2 | 0.018 | 0 | -0.018 | 0.060 | -0.079 | -0.011 | -0.937 | | -1.125 |
| | 15 | 3 | -0.060 | 2 | 2.060 | 1.981 | 0.079 | -0.011 | 1.054 | | -1.125 |
| | 16 | 0 | 0.019 | -1 | -1.019 | -1.072 | 0.053 | -0.011 | -0.007 | | -1.061 |
| : | : | : | : | : | : | : | : | : | : | | : |

FIG13 A

| | | | | | | | | | | |
|---|---|---|---|---|---|---|---|---|---|---|
| .. | | .. | .. | | | .. | .. | .. | .. | .. |
| Rev12 | 49 | 1 | 0.000 | -1.000 | -1.000 | -1.000 | 0.000 | 0.000 | -1.000 | 0.000 | 2.000 |
| | 50 | 2 | 0.000 | 0.000 | 0.000 | 0.000 | 0.000 | -1.000 | 0.000 | 0.000 | 2.000 |
| | 51 | 3 | 0.000 | 2.000 | 2.000 | 1.000 | 0.000 | -1.000 | -1.000 | 0.000 | 2.000 |
| | 52 | 0 | 0.000 | -1.000 | -1.000 | 0.000 | 0.000 | -1.000 | -1.000 | 0.000 | 2.000 |
| Rev13 | 53 | 1 | 0.000 | -1.000 | -1.000 | -1.000 | 0.000 | 0.000 | -1.000 | 0.000 | 2.000 |
| | 54 | 2 | 0.000 | 0.000 | 0.000 | 0.000 | 0.000 | -1.000 | 0.000 | 0.000 | 2.000 |
| | 55 | 3 | 0.000 | 2.000 | 2.000 | 1.000 | 0.000 | -1.000 | -1.000 | 0.000 | 2.000 |
| | 56 | 0 | 0.000 | -1.000 | -1.000 | 0.000 | 0.000 | -1.000 | -1.000 | 0.000 | 2.000 |
| Rev14 | 57 | 1 | 0.000 | -1.000 | -1.000 | -1.000 | 0.000 | 0.000 | -1.000 | 0.000 | 2.000 |
| | 58 | 2 | 0.000 | 0.000 | 0.000 | 0.000 | 0.000 | -1.000 | 0.000 | 0.000 | 2.000 |
| | 59 | 3 | 0.000 | 2.000 | 2.000 | 1.000 | 0.000 | -1.000 | -1.000 | 0.000 | 2.000 |
| | 60 | 0 | 0.000 | -1.000 | -1.000 | 0.000 | 0.000 | -1.000 | -1.000 | 0.000 | 2.000 |

CONTENTS OF RUNOUT TABLE 280

FIG 13 B

REPEATABLE RUNOUT CANCELLATION IN SECTORED SERVO DISK DRIVE POSITIONING SYSTEM

This application is a divisional of U.S. patent application Ser. No. 08/946,805 filed on Oct. 8, 1997, now U.S. Pat. No. 6,141,175.

FIELD OF THE INVENTION

The present invention relates generally to rotating magnetic disk drives and, more particularly, to a method of learning and thereafter canceling repeatable runout written to a servo track during the servowriting process for accurately track following at a desired position relative to a servo track center

DESCRIPTION OF THE RELATED ART

A conventional disk drive has a head disk assembly ("HDA") including at least one magnetic disk ("disk"), a spindle motor for rapidly rotating the disk, and a head stack assembly ("HSA") that includes a head gimbal assembly (HGA) with a transducer head for reading and writing data. The HSA forms part of a servo control system that positions the transducer head over a particular track on the disk to read or write information from that track.

The industry presently prefers a "rotary" or "swing-type" actuator assembly which conventionally comprises an actuator body that rotates on a pivot assembly between limited positions, a coil that extends from one side of the actuator body to interact with a pair of permanent magnets to form a voice coil motor, and an actuator arm that extends from the opposite side of the actuator body to support the HGA.

Each surface of each disk conventionally contains a plurality of concentric data tracks angularly divided into a plurality of data sectors. In addition, special servo information is provided on each disk or on another disk to determine the position of the head. The most popular form of servo is called "embedded servo" wherein the servo information is written in a plurality of servo wedges that are angularly spaced from one another and interspersed between data sectors around each track of each disk. Each servo wedge generally comprises a track identification (ID) field and a group of servo bursts (an alternating pattern of magnetic transitions) which the servo control system samples to align the transducer head with or relative to a particular servo track or one or more corresponding data tracks. The servo control system moves the transducer toward a desired track during a coarse "seek" mode using the track ID field as a control input. Once the transducer head is generally over the desired track, the servo control system uses the servo bursts to keep the transducer head over that track in a fine "track follow" mode. The transducer generally reads the servo bursts to produce a position error signal (PES) that is 0 when the transducer is at a particular radial position. The position where the PES=0 may or may not be at the servo track or data track center, however, depending on the magnetic characteristics of the transducer, the arrangement of the servo bursts, and the formula used to calculate the PES.

The general goal of the servo control system is to control the head position relative to a desired position—i.e. to get it there and to keep it there. There are numerous outside influences which make it difficult for the servo control system to achieve to control the head position, but a particularly troublesome influence is known as "runout."

Runout generally refers to deviation from perfect circular motion and, more particularly, refers to variation in the distance between an external point of reference and a passing surface of a rotating object. "Repeatable runout" involves periodic deviations that occur with predictable regularity (hereafter "RRO"). "Nonrepeatable runout" involves random perturbations due, for example, to bearing slop, shock events, and so on (hereafter NRRO). Perturbations due to NRRO generally cannot be removed. The present invention is directed to RRO as R affects disk drives.

In the context of a disk drive, RRO is "repeatable" because it occurs in sync with the spinning disk. RRO comes from one or more of the following mechanical sources:

a) spindle motor runout;
 b) disk slippage;
 c) disk warping;
 d) disturbances converted to RRO during the Servo Writing process due, for example, to NRRO, vibrations, resonances, media defects, or disk distortion due to clamping of the HDA.

RRO may also be caused by electromagnetic imperfections due to low quality servo bursts, even if they were mechanically recorded on the ideal circle. This is true because the low quality bursts will yield incorrect position information.

At least one other inventor has tried to reduce the effect of RRO in magnetic disk drives, as shown by U.S. Pat. No. 5,550,685, which issued to David M. Drouin on Aug. 27, 1996, was assigned to Syquest Technology, Inc., and is entitled "APPLYING ADAPTIVE FEED-FORWARD ALGORITHM AS A FREQUENCY SELECTIVE FILTER IN A CLOSED LOOP DISK DRIVE SERVO SYSTEM IN ORDER TO COMPENSATE FOR PERIODIC PERTURBATIONS WHICH OTHERWISE APPEAR IN THE SERVO SYSTEM POSITION ERROR SIGNAL." The '685 patent primarily deals with tracking RRO at or above the "1F" rotational frequency of the disk (see 2:47–50 and 3:43–46). In other words, the '685 patent detrimentally tries to follow the RRO, rather than trying to cancel it altogether.

There remains a need, therefore, for a method of canceling RRO wherein the drive is independently capable of learning the RRO associated with each or with a selection portion of its servo wedges without need for attachment to a servowriter, for storing such RRO data, and for thereafter effectively canceling the effect of the RRO when the servo control system is track following on a servo track by correcting the position error signal (PES) from each such servo wedge based on the stored RRO data.

SUMMARY OF THE INVENTION

The proposed method learns about servo written RRO using the drive's own heads and the drive's own servo control system without need for extremely accurate positioning that must ordinarily be provided by a servo writer for this purpose. The method is an adaptive averaging method that converges on a best fit servo track according to conditions experienced by the drive's own head and servo control system during several revolutions of the drive's disk while the servo control system's open loop response is intentionally dulled with respect to higher frequencies in order to maintain stability.

In a first aspect, the present invention resides in a method for determining repeatable runout cancellation values in a disk drive having a magnetic disk with a plurality of tracks that each contain a plurality of servo wedges, a means for rotating the magnetic disk at a rotation frequency, a transducer head mounted on an actuator, a means for moving the actuator, and a sampled servo controller for reading signals from the transducer head and for providing servo compensation signals to the actuator moving means for positioning the transducer head.

The method more specifically comprises the steps of: (a) initializing a wedge runout value for each servo wedge in a current track; (b) initializing an average uncorrected runout value; (c) track following the current track with the sampled servo controller operating in a low bandwidth mode so that the sampled servo controller is less responsive to high frequency components of the repeatable runout; (d) waiting for a current servo wedge of the current track; (e) reading from the transducer head to produce a raw position error signal which may have a repeatable runout component for the current servo wedge; (f) computing an interim wedge runout estimate for the current servo wedge by adding a first multiple of the raw position error signal to a second multiple of the wedge runout value for the current wedge; (g) computing a corrected position error signal by subtracting the interim wedge runout estimate from the raw position error signal; (h) moving the transducer head based on the corrected position error signal; (i) computing a new wedge runout value for the current wedge by subtracting the average uncorrected runout value from the interim wedge runout estimate for the current wedge; (j) saving the new wedge runout value for the current wedge; (k) repeating steps (d) through (k) for each of the plurality of servo wedges in a complete revolution; (l) revising the average uncorrected repeatable runout value based on the wedge runout values of the servo wedges in the complete revolution; and (m) repeating steps (d) through (k) for a desired number of revolutions.

The present invention also resides in actually using the wedge runout values to cancel the effect of the servo written repeatable runout. In a preferred embodiment, the wedge runout values for each and every servo wedge are stored and, moreover, such wedge runout values are preferably written to the disk one wedge in advance for use in cancellation of the runout.

It may not be possible or desirable to store all such information. In such case, the invention may be implemented in a second aspect as a method for selectively correcting repeatable runout in a disk drive having a magnetic disk with a plurality of tracks that each have a cylinder address and a plurality of servo wedges, a means for rotating the magnetic disk at a rotation frequency, a transducer head mounted on an actuator, a means for moving the actuator, and a sampled servo controller for reading signals from the transducer head and for providing servo compensation signals to the actuator moving means for positioning the transducer head over the magnetic disk, the method comprising the steps of storing wedge runout values only for servo wedges with wedge runout values that exceed a predetermined threshold; determining that a servo wedge having an wedge runout value that exceeds the predetermined threshold is the next wedge to pass under the transducer head; and providing the wedge runout value to the sampled servo controller.

BRIEF DESCRIPTION OF THE DRAWINGS

The just summarized invention may best be understood with reference to the Figures of which:

FIG. 3E shows that if we had a wedge runout value r(k) representing how much RRO was present in each wedge of the Repetitive Position Reference, then we cancel the effect of RRO by subtracting the wedge runout value r(k) from the raw position feedback signal e(k) for each such wedge;

FIG. 3F is a block diagram showing a series of wedge runout values r(k) may be used to remove RRO from a raw position error signal e1(k) to produce a corrected position error signal e2(k) wherein the system is viewed, as substantially shown in FIG. 3C, as having a fixed position reference and an external source of actual RRO that varies, wedge by wedge, for a given track;

FIG. 12-0 is a schematic diagram related to a simplified example which assumes the system is stable and shows the operation of the present invention in connection with an initial revolution Rev0 of a hypothetical disk having four sectors and four corresponding servo wedges;

FIG. 12-1 is a schematic diagram related to the simplified example but showing the operation of the present invention in connection with a subsequent revolution Rev1 of the hypothetical disk of FIG. 12-0;

FIG. 13 (presented in two parts as 13A and 13B) is a numeric spreadsheet related to the simplified example showing the values which are calculated in Steps 311, 312, 313, 315, and 316 and showing how the servo wedge entries in the learned runout table 280 approach the actual wedge runout values through several revolutions Rev0 to Rev20 of the hypothetical disk of FIGS. 12-0 and 12-1, wherein $\lambda=0.5$;

DETAILED DESCRIPTION OF THE PREFERRED EMBODIMENTS

Figure 1:
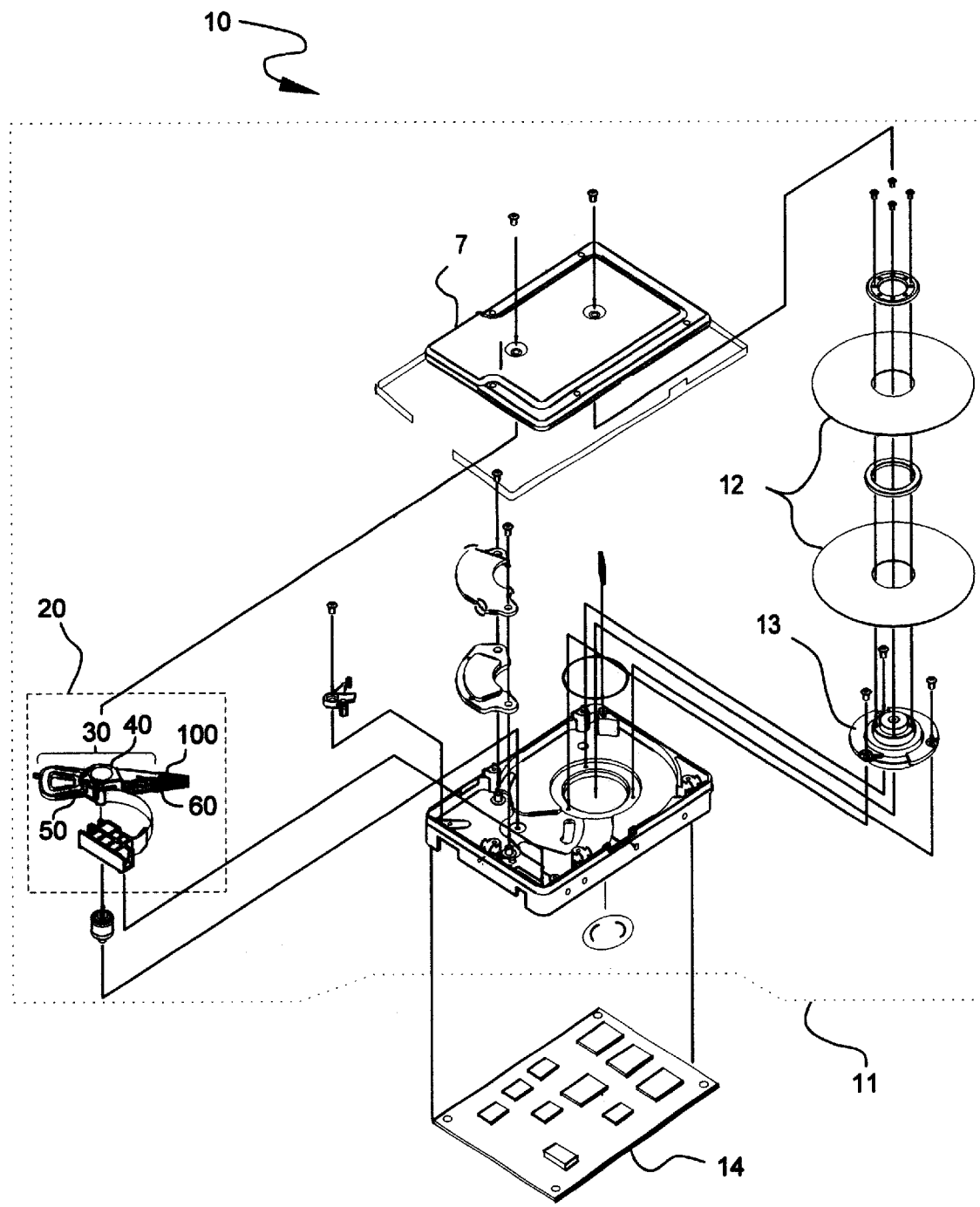
FIG. 1 is an exploded perspective view of a magnetic disk drive 10 having a head disk assembly 11 ("HDA") including a head stack assembly 20 ("HSA") which carries a Magneto-Resistive transducer over concentric data tracks and associated servo bursts on the surface of a disk 12.

FIG. 1 shows the principal components of a disk drive 10 in which a repeatable runout cancellation method according to the present invention may be implemented. The disk drive 10 shown is an integrated drive electronics (IDE) drive, comprising a head disk assembly (HDA) 11 and a controller circuit board 14.

The HDA 11 of FIG. 1 comprises a magnetic disk 12 (2 shown), a spindle motor 13 for rapidly rotating the disk 12, and a head stack assembly 20 located next to the disk 12. The head stack assembly 20 comprises a swing-type actuator assembly 30 having a voice coil 50, an actuator body 40, and an actuator arm 60. At least one head gimbal assembly 100 extends from each actuator arm 60 and carries a head 140 (see FIG. 1A) over the disk 12.

The head stack assembly 20 is located so that the head 140 of the head gimbal assembly 100 is biased towards and moveable over the disk 12. The HDA's storage capacity may be increased, as shown in FIG. 1, by including several disks 12 and by providing a head stack assembly 20 having a vertical "stack" of head gimbal assemblies 100 and associated heads 140 for each surface of each disk 12, the head gimbal assemblies 100 supported by multiple actuator arms 60.

Figure 1A:
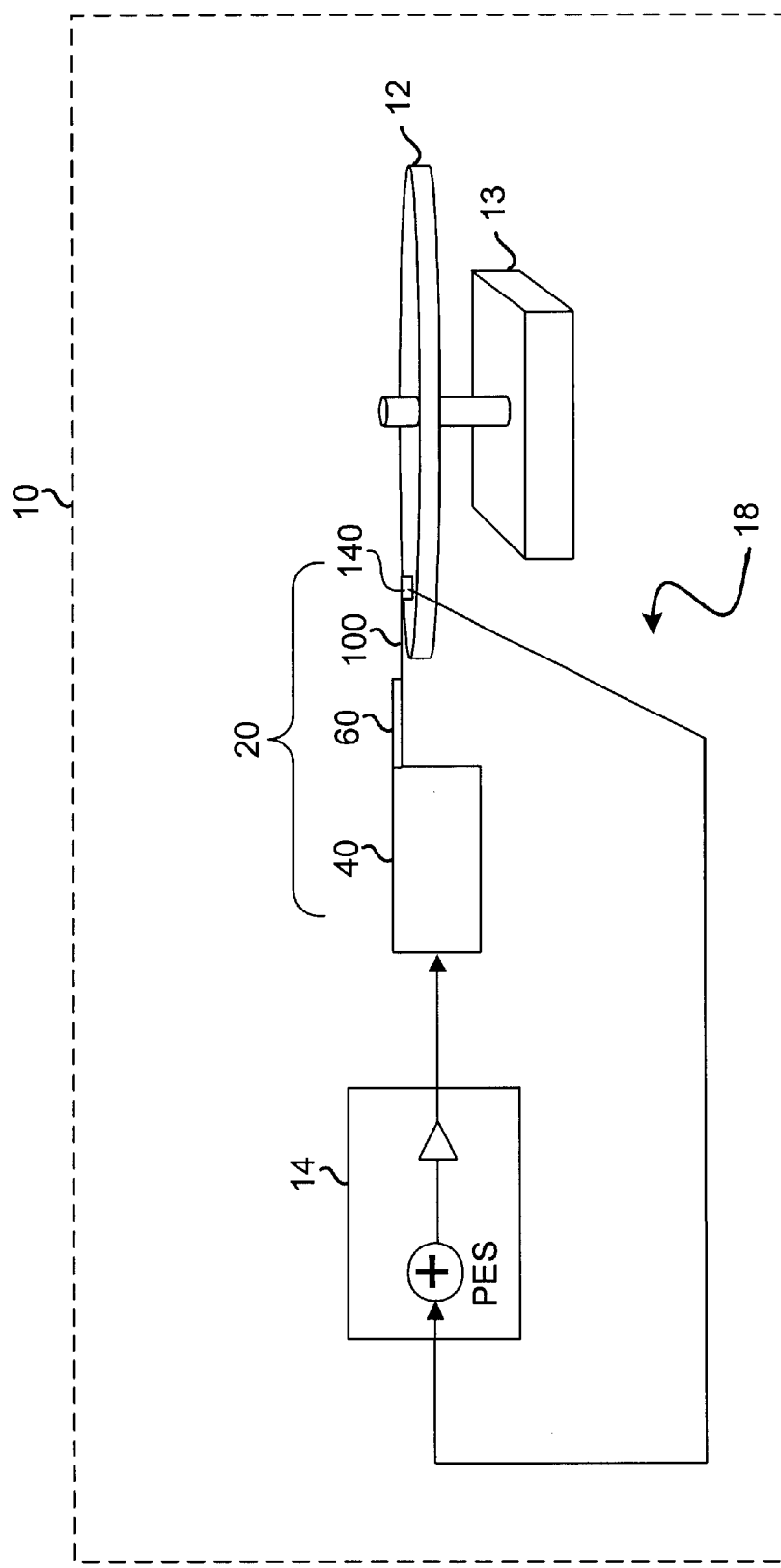
FIG. 1A is a schematic block diagram of a servo control loop 18 used to position a transducer head 140 over a surface of a disk 12 in the disk drive 10 of FIG. 1.

FIG. 1A is a schematic, block diagram of a servo control loop 18 used to position a transducer head 140 over a surface of a disk 12 in the disk drive 10 of FIG. 1. As suggested therein, servo electronics within the controller circuit board 14 control the actuator 20 based on servo signals fed back from the transducer head 140 as it passes over the servo wedges. A detailed description of the servo control loop is unnecessary because its general operation is well known in the industry.

As explained above, a sampled servo or sectored servo is presently preferred. In such an arrangement, servo fields comprising groups or "bursts" of magnetic transitions are recorded in a radially displaced fashion within a servo sector. There are many possible servo burst patterns. In the simplest case, two bursts are used per servo track which may or may not be concentric with one or more corresponding data tracks. The two servo bursts are usually designated as the "A" burst and the "B" burst. The radial displacement in such case places the A burst to one side of the servo track centerline and the B burst to the other side. The A and B bursts are also displaced from one another in terms of angular position such that the head first passes over the A burst and then over the B burst. If the head is aligned with the servo track centerline, then the head will pass over equal amounts of the A and B bursts and the servo electronics will develop a Position Error Signal (PES) which, in the usual case, is equal to zero. If the head is displaced from the centerline, then the head will pass over more of the A burst or over more of the B burst so that the PES will be nonzero, the sign of the PES indicating the direction of displacement. The PES is used by the servo electronics to attain and then maintain a desired position.

The servo bursts are recorded on each surface of each disk at the time of manufacture with a device called a servowriter. The servowriter is basically a jig which mounts a HDA and then mechanically moves the heads to a given reference position under control of a precision laser guided measurement system. The HDA is then driven to write the servo track information for that position. The process is repeated for as many incremental movements of the heads as are required to write all servo tracks across the disk. A servowriter is very expensive, each one costing $100,000.00 or more. It is important from a cost perspective, therefore, to minimize the time each drive must spend with the servowriter and thereby reduce the number of servowriters needed for a given production rate.

Figure 2B:
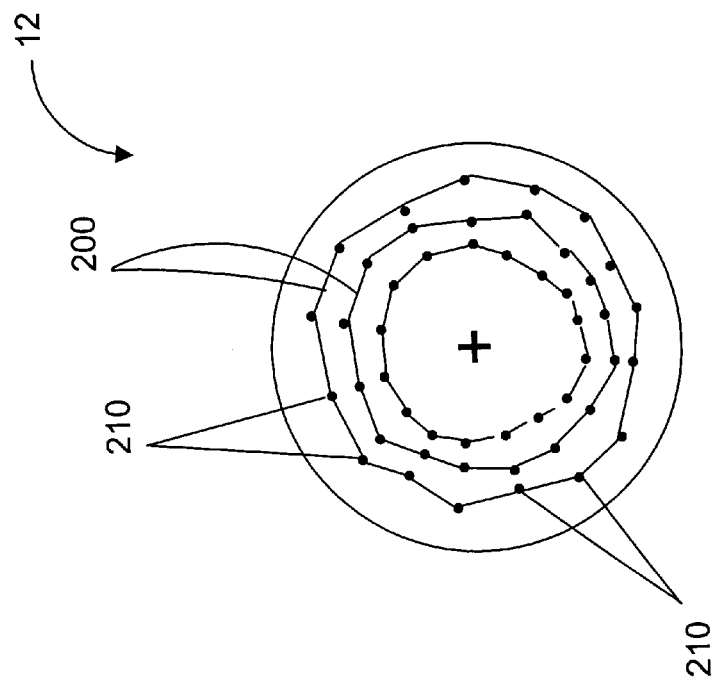
FIG. 2B is a conceptual diagram of a real disk with servo tracks and corresponding servo fields that were recorded by a servowriter and are noncircular due to physical and electromagnetic deviations from the ideal.
Figure 2A:
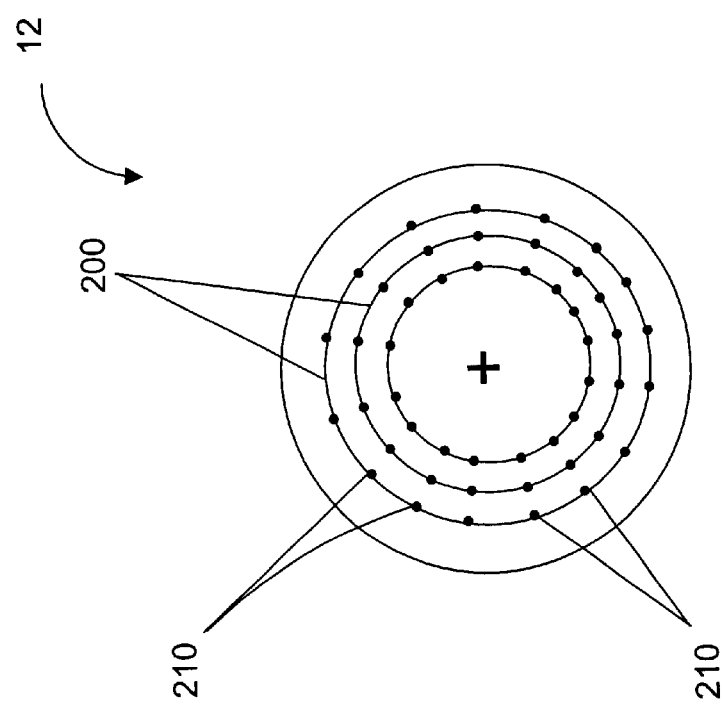
FIG. 2A is a conceptual diagram of an ideal disk having servo tracks and corresponding servo fields that occupy perfect circles.

As shown in FIG. 2A, the ideal servo tracks 200 on a rotating magnetic disk 12 form "perfect" circles which may or may not have systematic 1F (off axis) and 2F (oval) components that are predictable from track to track. More particularly, each ideal servo track 200 contains a plurality of servo fields 210 comprising two or more servo bursts that are recorded relative to a perfect circle. The conventional servo control system follows the servo fields. If the written servo fields deviate from the perfect circle, and are uncompensated, the servo control system may be presented with large position errors and be unable to accurately follow the servo track.

As shown in FIG. 2B, however, the written servo tracks 200 of a real disk 12 are often randomly imperfect, usually meaning noncircular, because the servo fields 210 may be displaced to either side of the ideal servo tracks due to disturbances that occurred during the servowriting process, due to low quality servo bursts, or both. In either case, the result is RRO that makes it harder for the servo control system to follow the servo tracks 200.

The present invention provides a method and apparatus for canceling the servo written RRO during track following operations, thereby making the effective servo track shape closer to the ideal circle. The present invention accomplishes runout cancellation by "learning" the runout associated with each servo wedge of each track and then storing the learned runout data for later use in making an "on the fly" adjustment of the PES associated with each servo wedge. As described in more detail below, the leaned runout is preferably stored on the disk, one wedge in advance, but the data for some or all of the wedges may be temporarily stored as a group in unused tracks and loaded at startup into RAM for use in canceling the RRO, or permanently stored entirely off-disk in any desired memory means such as RAM or ROM. Of significance with respect to minimizing production time and overall cost, the learning phase of the present invention does not require that the drive be attached to the servowriter. Instead, each drive may independently learn about its own servo written RRO during a subsequent manufacturing phase known as intelligent burn in (IBI).

Operational Theory

In a disk drive, one of the main tasks of the servo control system is to keep the head as close as possible to a desired position such as a track center. FIGS. 3A to 3F show how this task is accomplished under ideal conditions, how RRO and NRRO complicate this task, and how the effect of RRO may theoretically be removed in a wedge-by-wedge fashion.

Figure 3A:
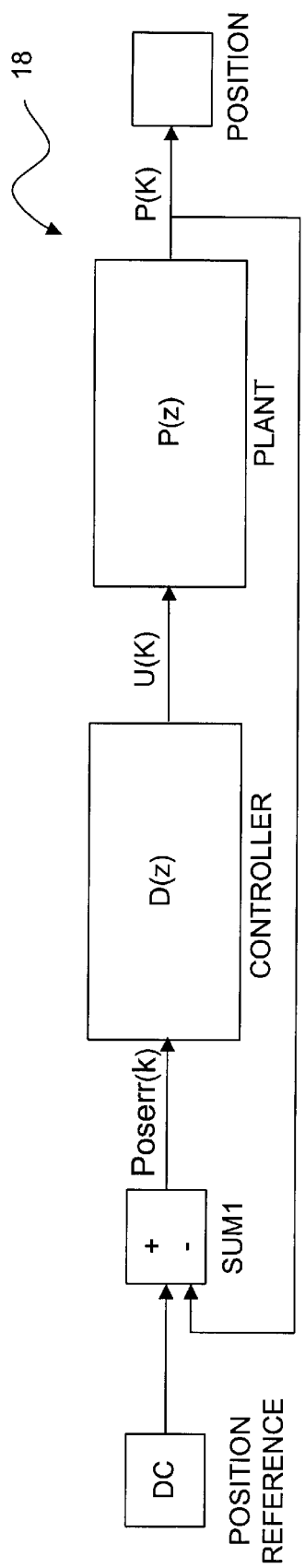
FIG. 3A is a block diagram of an ideal servo loop 18 that receives a desired position reference that has a fixed "DC" value for a given revolution, typically zero, and wherein the position feedback signal e(k) is based on a detected position signal p(k) that occurs in response to a control effort u(k)

FIG. 3A is a block diagram of an ideal servo loop 18 that receives a desired position reference that has a fixed "DC" value for a given revolution, typically zero, and wherein the position feedback signal e(k) is based on a detected position signal p(k) that occurs in response to a control effort u(k).

Figure 3B:
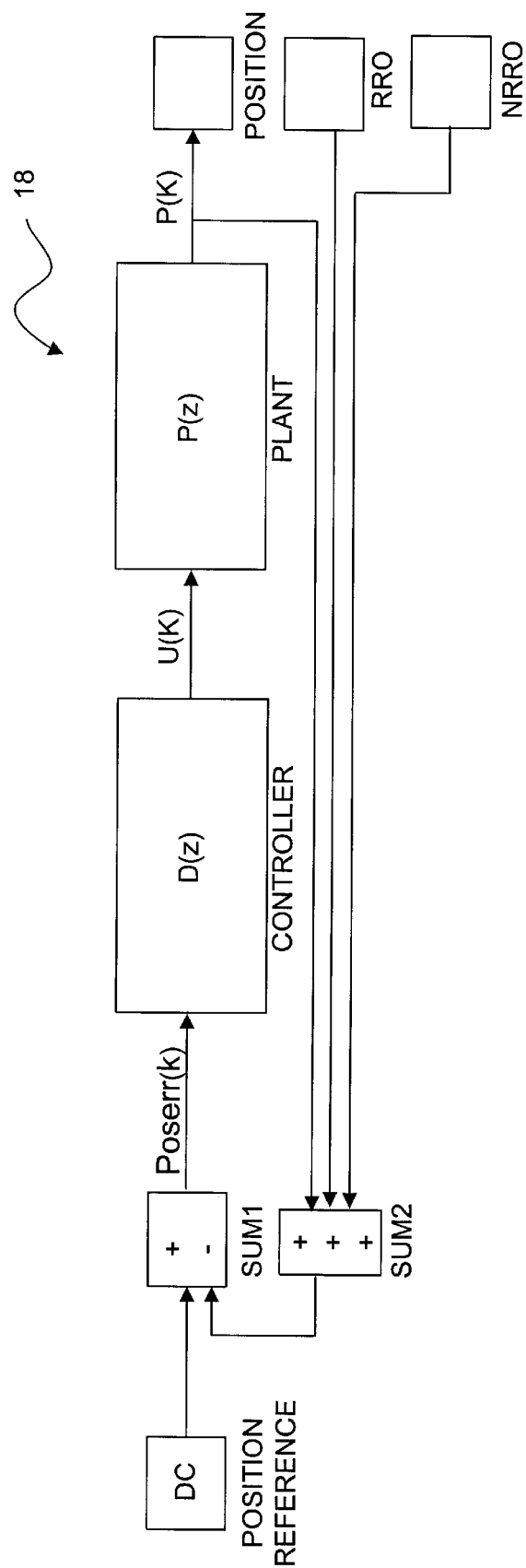
FIG. 3B shows how runout disturbances RRO and NRRO that are unassociated with the control effort u(k) and detected position signal p(k) detrimentally distort the resulting position feedback signal e(k) in the servo control loop 18 of FIG. 3A.

FIG. 3B shows how runout disturbances RRO and NRRO that are unassociated with the control effort u(k) and detected position signal p(k) detrimentally distort the resulting position feedback signal e(k) in the servo control loop 18 of FIG. 3A. The RRO and NRRO components may cause the head to diverge from the position to be followed.

Figure 3C:
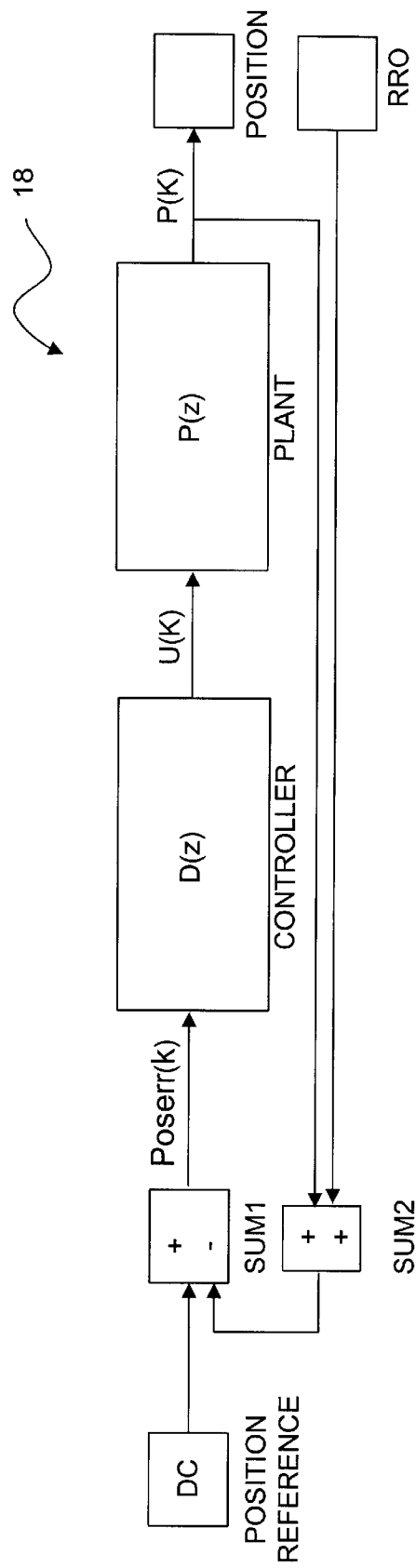
FIG. 3C is a simplification of the block diagram of FIG. 3B in that the NRRO is ignored and only the detrimental effect of RRO is considered.

FIG. 3C is a simplification of the block diagram of FIG. 3B in that the NRRO is ignored and only the detrimental effect of RRO is considered as that is the contribution to which the present invention is directed.

Figure 3D:
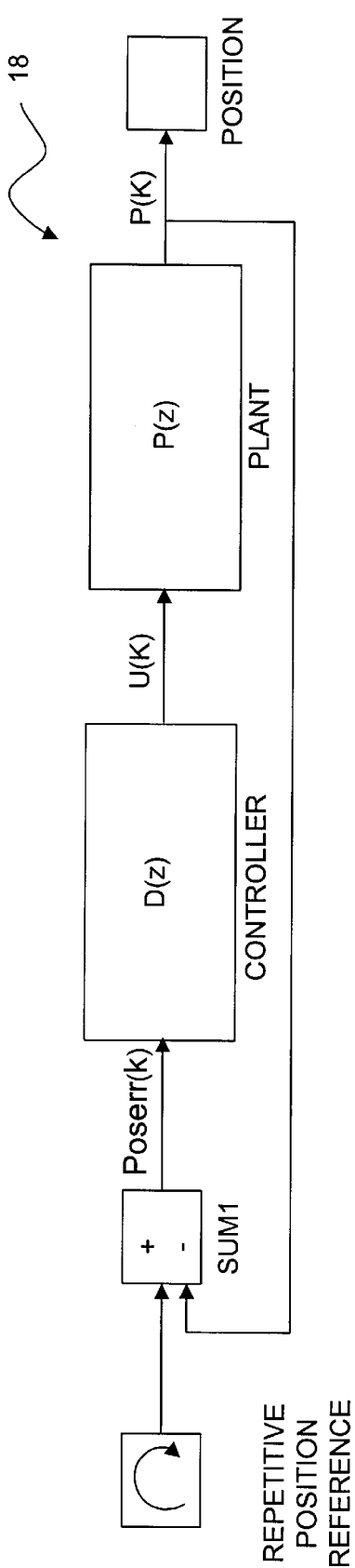
FIG. 3D is another way of viewing the block diagram of FIG. 3C wherein the effect of RRO is contained in a Repetitive Position Reference that varies wedge-by-wedge, rather than as an external wedge-by-wedge disturbance relative to a fixed position reference.

FIG. 3D is another way of viewing the block diagram of FIG. 3C. In this case, the effect of RRO is viewed as contained in a "Repetitive Position Reference" that varies wedge-by-wedge, rather than as an external wedge-by-wedge disturbance relative to a fixed position reference. This point of view simply makes it easier to understand how the RRO may be learned and removed, wedge-by-wedge, in accordance with the principles of the present invention.

FIG. 3E shows that if we had a wedge runout value r(k) representing how much RRO was present in each wedge of the Repetitive Position Reference, then we can cancel the effect of RRO by subtracting the wedge runout value r(k) from the raw position feedback signal e(k) for each such wedge.

FIG. 3F is a block diagram showing a series of "learned" wedge runout values r(k) may be used to remove RRO from a raw position error signal e1(k) to produce a corrected position error signal e2(k) wherein the system is viewed, as substantially shown in FIG. 3C, as having a fixed position reference and actual RRO that varies, wedge by wedge, for a given track.

RRO Learning

Since RRO varies from track to track, each servo track must be individually learned. However, because RRO is repeatable, each drive only needs to learn its RRO once and can then reuse the data indefinitely.

Figure 4:
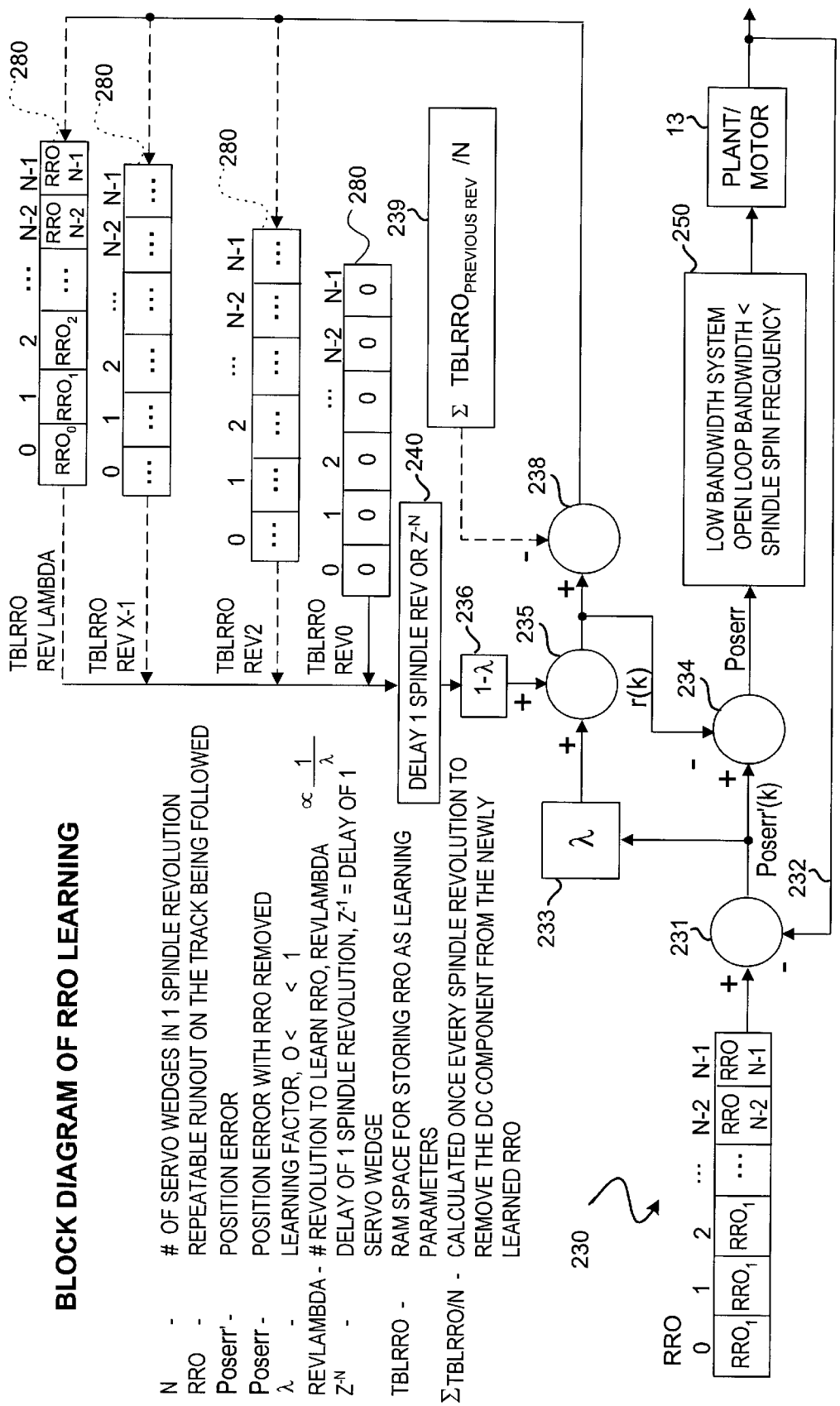
FIG. 4 is a conceptual block diagram of a first preferred embodiment for learning the estimated wedge runout r(k) for each track by processing the actual, unknown runout data 230 from each track with a low bandwidth compensator in order to "learn" the runout values and record them in a runout table TblRRO for later use in canceling the runout from the position error signal while track following with a high bandwidth compensator.

FIG. 4 is a conceptual block diagram that illustrates a preferred learning phase of this invention as it relates to a servo track of a disk divided into N sectors and having N servo wedges. As suggested therein, the track is characterized by a plurality of repeatable runout values $RRO_0$, $RRO_1$, $RRO_2$, ... $RRO_{N-2}$, $RRO_{N-1}$. These values are generally identified as 230. It is important to understand that the servo fields 210 causing the RRO values 230 are in unknown positions and that the magnitude of the RRO values 230 will change depending on the radial position of the head 140 relative to each corresponding servo field 210.

As suggested by FIG. 4, the incoming RRO values 230 are successively measured during one revolution and input to the servo control system 18. As explained in more detail with respect to steps 309–318 of FIG. 6, described below, the servo track's RRO values 230 may begin to arrive at any point in the series. For simplicity's sake, however, we will assume that the first servo wedge encountered is Wedge#0 and that the first RRO value 230 processed in a given revolution is $RRO_0$.

In operation, each of the servo track's successive RRO values 230 are input to a first junction 231 where they are combined with a feedback signal 232 in order to produce a "raw" position error signal PosErr'(k). In an ideal drive with absolutely no runout, as shown in FIG. 2a, and assuming there are no other disturbances, each of the servo track's RRO values $RRO_0$ to $RRO_{N-1}$ would be zero and the corresponding raw position error signals PosErr'(1) to PosErr'(N) would also be zero. In a real drive, however, the RRO values 230 will vary on either side of zero. During a revolution around a particular track in a drive which resolves each cylinder into 256 units and specifies radial displacement in units of ($2^{-8}$ cyl.), for example, the RRO values 230 of successive servo wedges might take on the values of +2, +1, 0, −1, +1, 0, 0, +3, −14, +1, and so on.

As further shown in FIG. 4, each successive raw position error signal PosErr'(k) signal associated with a particular wedge's RRO value 230 is multiplied at block 233 by a first multiplier or "learning factor" λ and provided to a second junction 234 which subtracts an interim wedge runout estimate r(k) from the raw position error signal PosErr'(k) to provide a corrected error position signal PosErr(k) to the compensator 250 while it is operating in a low bandwidth mode.

Figure 5B:
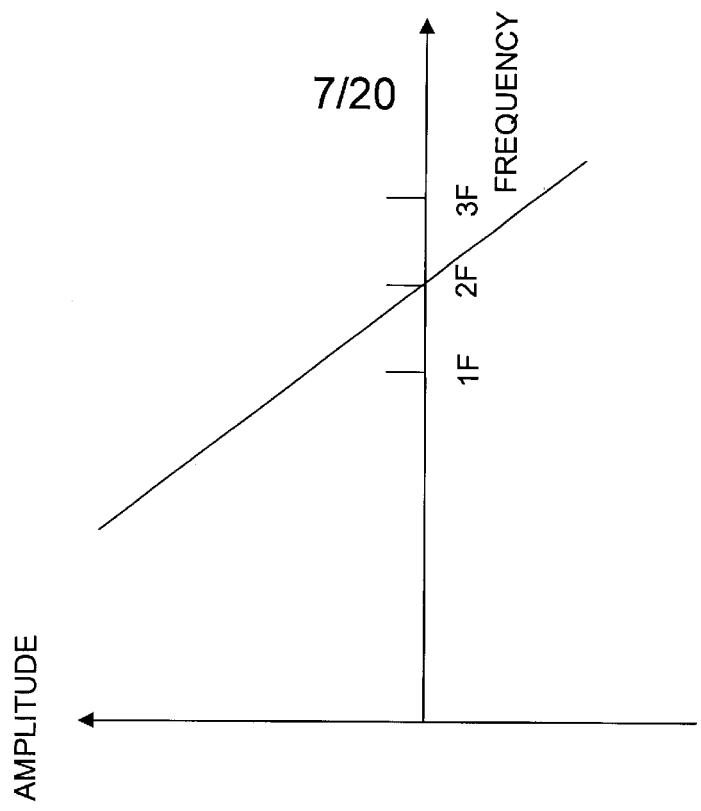
FIG. 5B is an amplitude versus frequency plot of the open loop gain of the low bandwidth compensator 250 where its 0 dB point is at or below 2F such that the system may learn RRO with substantially decreased sensitivity to the higher frequency components of the RRO while still maintaining sufficient responsiveness to frequencies needed to operate the drive.
Figure 5A:
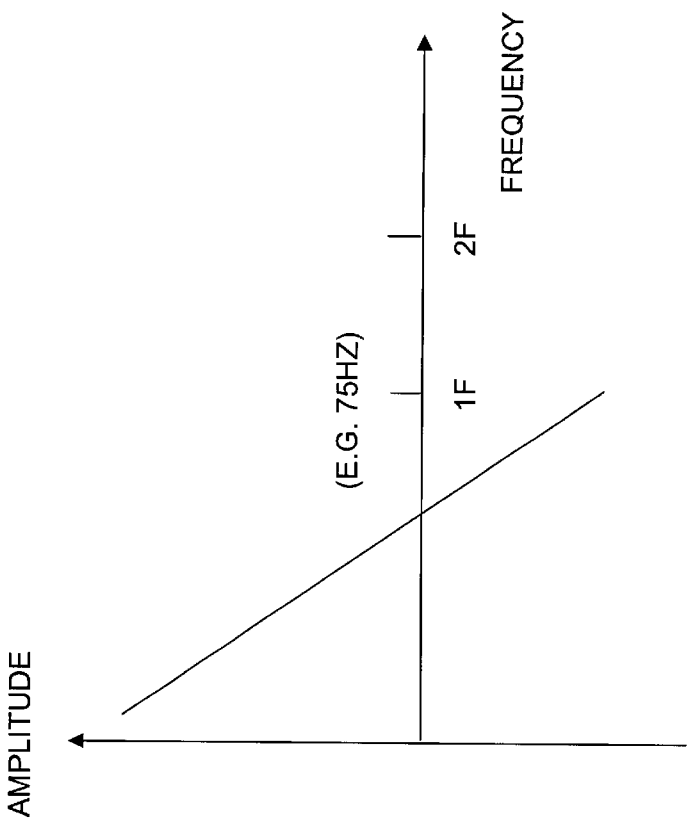
FIG. 5A is an amplitude versus frequency plot of the open loop gain of the low bandwidth compensator 250 where its 0 dB point is below 1F such that the system may learn RRO with substantially decreased sensitivity to the higher frequency components of the RRO.

The inventors presently contemplate two approaches to learning RRO as shown in FIGS. 5A and 5B. A disk drive according to the present invention learns the RRO while configured in such a way that it does not respond significantly to the RRO. In order to understand this last statement, It should be remembered that the position error signals resulting from servo wedges containing RRO contains frequency components from DC to high frequencies well above 1F even though each wedge is only presented to the head once per revolution. The goal of the present invention is to measure the runout of a track being followed while not allowing the various frequency components of the runout to cause instability in the servo control system and make the head deviate from the track by a significant amount or, worse, diverge altogether. While learning the RRO, therefore, the present invention lowers the compensator's open loop frequency response to dull the servo loop's response to the high frequency components of the RRO, on the one hand, and uses the firmware to periodically remove the cumulative contribution of the low frequency DC components, on the other.

In the embodiment of FIG. 5A, the 0 dB point of the system open loop bandwidth is less than the fundamental spin frequency (sometimes called "1F"). As a result, the servo control system 18 will react very slowly to non-DC disturbances and, more particularly, will not react significantly to disturbances at the fundamental spin frequency 1F or its higher frequency harmonics 2F, 3F, and so on. The system, however, must still accumulate and periodically remove the effect of the lower frequency components of the RRO, in this case only the DC component, so that the head does not diverge from the servo track being analyzed over a series of revolutions. In the preferred embodiment, the DC component is removed once per revolution. Under these low bandwidth conditions, the drive cannot do anything else while it is learning RRO.

In the second embodiment of FIG. 5B, however, the compensator's open loop bandwidth is higher than in FIG. 5A so that its 0 dB point includes the fundamental spin frequency 1F and its first harmonic 2F. Accordingly, the servo control system 18 will still react to 1F and 2F disturbances, but will not react significantly to higher frequencies. As a result of keeping 1F and 2F frequencies in the loop, we can reduce the amount of time needed for 1B1 because the drive may continue to perform other functions while learning RRO. We can still isolate and learn the RRO, however, by adaptively canceling the 1F and 2F contributions using known on-the-fly techniques, while periodically removing the DC component once per revolution as before.

Returning to FIG. 4, as generally shown in the upper portion of thereof, the interim wedge runout estimate r(k) that is input to junction 234 is developed by using a learned runout table TblRRO 280 that was updated with data from a previous revolution. The number of entries in the learned runout table 280 equals the number of servo wedges per track, i.e. N. The table's N servo wedge entries, 0 to N−1, are initially set to zero such that the interim wedge runout estimate r(k) is set to the ideal value of zero for each of the servo wedges during the first revolution. However—as suggested by the interconnection between junction 238, previous RRODC block 239, and the revolution delay block 240—the interim wedge runout estimates r(k) during subsequent revolutions are likely to be nonzero because the system successively updates the table's servo wedge entries, 0 to N−1, and uses those entries to modify the subsequent interim wedge runout estimates r(k) related to corresponding servo wedges. This updating of the table entries occurs during each revolution—including the first. The delayed use of the table's servo wedge entries 0 to N−1 during successive revolutions is suggested in FIG. 4 by showing several iterations of the learned runout table 280 in a perspective view representative of time. The states of the runout table 280 at successive revolutions are labeled from Rev0 to RevLambda and which, with the notable exception of Rev0, are influenced by the delay block 240. FIG. 4 shows the state of a single learned runout table 280 for each of several revolutions. Although it is certainly possible to do so, the preferred system does not actually use several tables.

A first block 233 serves as the input to the portion of the system that determines the interim wedge runout estimate r(k). The input to the first block 233 is the raw position error signal PosErr'(k) from a given servo wedge and its output is a first multiple of the raw position error signal, i.e. λ*PosErr'(k). A second block 236 receives its input from the corresponding servo wedge entry TblRRO(k) in the learned runout table 280, multiplies it by a second multiplicand (1−λ), and outputs (1−λ)*TblRRO(k). Finally, a junction 235 adds the outputs of the first and second blocks 233, 236 to produce the interim wedge runout estimate r(k) for the given servo wedge, wherein:

$$r(k)=\lambda*PosErr'+(1-\lambda)*TblRRO(k) \qquad (1)$$

Figure 6A:
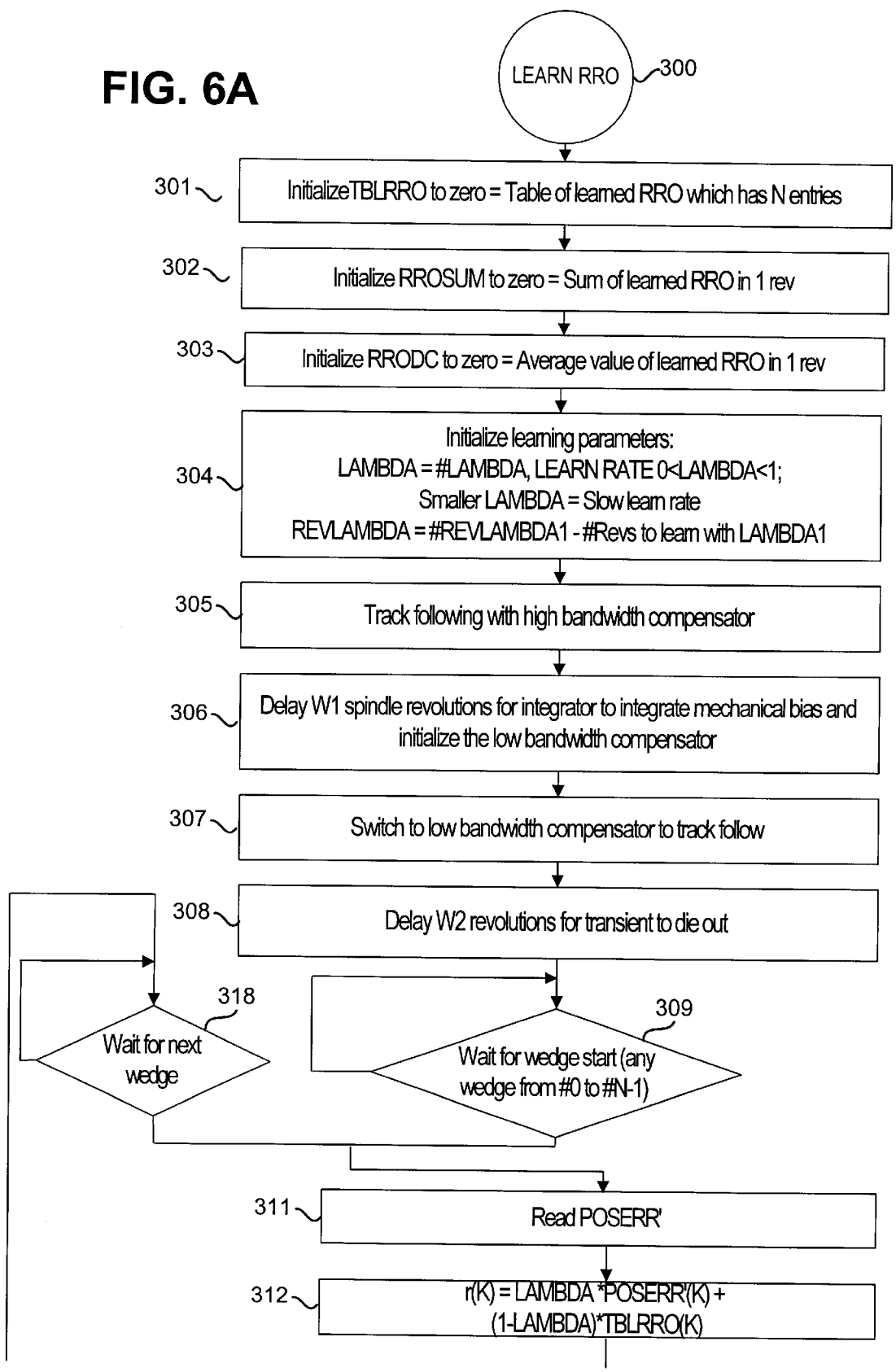
FIG. 6 is a detailed block diagram of the first preferred embodiment of the method shown generally in FIG. 3.
Figure 6B:
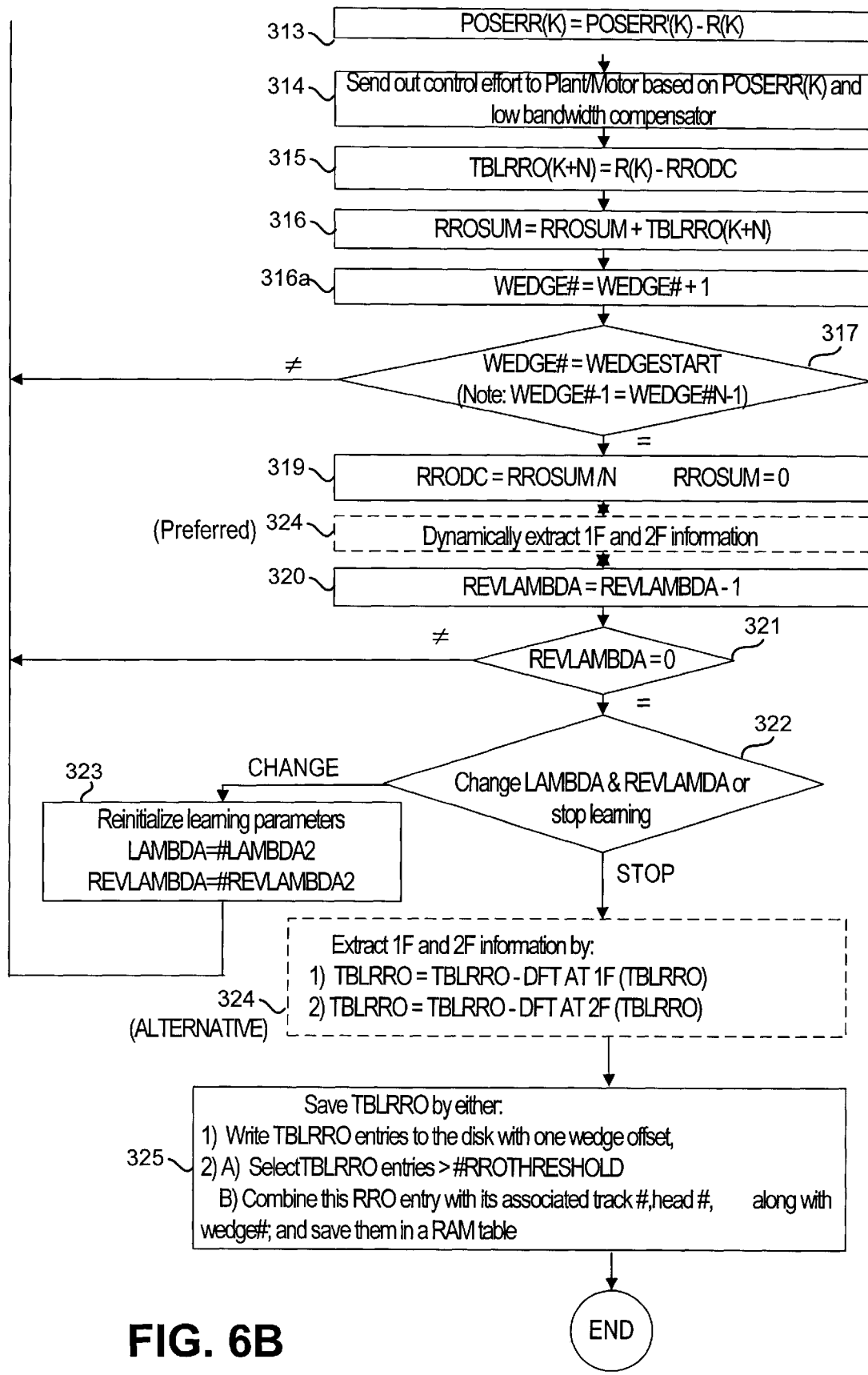

The RRO learning phase illustrated only schematically by FIG. 4, and described above, can be even better understood with reference to the following section taken in conjunction with FIG. 6.

Detailed Flow Chart of RRO Learning

FIG. 6 is a detailed flowchart that illustrates the steps of a preferred method of learning the RRO associated with each track. The steps are accomplished through servo firmware which enters a LearnRRO routine at 300.

At step 301, the system initializes the Learned Runout Table 280 by setting each of its entries, or wedge runout values, to zero.

At step 302, the system initializes a variable RROSum by setting its value to zero. The variable RROSum is used to accumulate the sum of learned RRO from the servo wedges in 1 revolution. The accumulation occurs inside a one revolution loop, at step 316, and the variable RROSum is cleared upon exiting the loop, at step 319, to separately accumulate the sum of the learned RRO in a subsequent revolution loop.

At step 303, the system initializes a variable RRODC by setting its value to zero. Later on, in step 319, the system loads the variable RRODC with the average value of learned RRO from the prior revolution by dividing the sum of learned RRO from the prior revolution by the number of servo wedges in each track, i.e. RRODC=RROSum/N. The value of RRODC, to the extent it is nonzero, represents an estimate of the DC component of the RRO that is unlearned as of a given revolution and must still be considered in evaluating the RRO for each wedge.

At step 304, the system initializes the "learning parameters" comprising a learning factor λ and a revolution factor RevLambda. The learning factor λ is a fractional number between zero and one, i.e. 0<λ<1. The learning factor λ determines the speed of learning. If the learning factor λ is closer to zero (e.g. 0.1), learning takes more revolutions and more time but is more accurate. If the learning factor λ is larger (e.g. 0.5), learning takes fewer revolutions and less time but is less accurate. The revolution factor RevLambda corresponds to the number of revolutions desired to converge on stable values in the runout table 280, i.e. to learn with a selected learning factor λ. In general, the revolution factor RevLambda is inversely proportional to the learning factor λ, as follows:

$$\text{revolution factor RevLambda} \propto \frac{1}{\text{learning factor } \lambda}$$

There is no constant relationship. The learning factor $\lambda$ and revolution factor RevLambda are determined empirically for a given drive. In one drive family, for example, a "fast" learning factor of $\lambda=0.05$ is used with a RevLambda of 60 and a "slow" learning factor of $\lambda=0.01$ is used with a RevLambda of 120. The fast learning factor permits the system to rapidly learn about 80% of the drive's RRO, and the slow learning factor permits the system to learn and smooth out the remaining 20% of the RRO. The inventors found this to be more time efficient than using only one factor, say 0.01 for example, to learn the RRO.

At steps 305 and 306, respectively, the system track follows with the compensator 250 operating in a high bandwidth mode and integrates over a delay period W1 that is sufficiently long that the system learns the DC component value related to a positive or negative bias asymmetrical forces acting on the HDA, for example, due to the ribbon cable 21. As a result, the read head is positioned over a nominal track centerline and we have initialized the integrator with a static value that accounts for the level of mechanical bias at this particular position of the HDA.

At step 307, the system switches the compensator 250 into a low bandwidth mode. At this point, we use the static integrator value that was integrated by the high bandwidth compensator in steps 305–306 such that we continue to compensate for mechanical bias.

A disk drive has a fundamental spin frequency that is proportional to the drive's operating RPM. The shorthand notation for the spin frequency is "1F." The fundamental spin frequencies 1F of drives operating at 4500, 5000, and 7200 RPM, respectively, are 75 Hz, 83.33 Hz, and 120 Hz. The RRO from successive servo wedges, however, has fundamental and harmonic frequency component from DC to $f_s/2$ where $f_s$ is N times the fundamental spin frequency 1F.

We want the servo control system 18 to detect the RRO of each wedge without overreacting to it. We will track follow, therefore, with the compensator set to a very low bandwidth so that the system will respond very slowly to non-DC disturbances. The compensator's low bandwidth helps maintain loop stability. The low bandwidth compensator provides a zero DB crossing below a desired frequency so that the control system is less responsive to the higher frequency components of the RRO. In essence, we make the servo control system 18 less responsive to higher frequency inputs. In FIG. 5A, the 0 dB point is below the fundamental spin frequency 1F, and in FIG. 5B, it is substantially at 2F. As to the low frequency DC components, we extract them in a periodic or adaptive manner. We account for the accumulated DC values on every revolution in both cases of FIGS. 5A and 5B. The DC bias is effectively ignored and removed, therefore, so long as it is sufficiently small during any one revolution. Finally, we remove the low frequency 1F and 2F components from the wedge runout values in order to isolate the RRO. In the case of FIG. 5A, we do so after building the runout table 280. In the case of FIG. 5B, we dynamically remove the 1F and 2F components along the way.

At step 308, the system pauses for a delay period W2 that is sufficiently long for transients to die out. This step is desired because the read head may continue "wiggling" for a short time after the system switches over from the "sharper" high bandwidth compensator to the "duller" low bandwidth compensator.

At step 309, the system waits for an initial servo wedge to arrive. The position of the read head is uncertain following the delay period W2 of step 308, to the first wedge could be any one of the track's N servo wedges. Which ever wedge arrives first, its wedge# is stored in a variable called "WedgeStart". WedgeStart essentially serves as a place holder. It permits the system to immediately start learning the RRO of the track, without delay, beginning with any one of its N servo wedges, wedge#0 to wedge#N-1.

Steps 311 to 318 comprise a one revolution process loop:

At step 311, the system reads the raw position error signal PosErr' associated with the current wedge, e.g. wedge#1. Absent any countervailing effect of NRRO, the raw position error signal PosErr'(k) will be nonzero if wedge#1 was written off position due to RRO.

At step 312, the system makes a first iterative calculation of the interim wedge runout estimate r(k) associated with the current wedge, e.g. wedge#1. In accordance with the present invention, and as described above with respect to FIG. 4, the interim wedge runout estimate r(k) is determined according to the formula:

$$r(k)=\lambda*PosErr'(k)+(1-\lambda)TblRRO(k) \quad (1)$$

Recall that in step 301, the Learned Runout Table 280 was initialized by setting each of its entries to zero. Recall also that in Step 304, we set the "learning rate" $\lambda$ to a value greater than zero but less than one. During the first revolution, therefore, the interim wedge runout estimate r(k) for each servo wedge is determined as a fractional part of the PosErr'(k) signal, i.e. $\lambda*PosErr'(k)$. During subsequent learning revolutions, however, the values in the runout table 280 will be nonzero and will come into play.

At steD 313, the corrected position error signal PosErr(k) is determined on the basis of the raw position error signal PosErr'(k) and the interim wedge runout estimate r(k), according to the formula:

$$PosErr(k)=PosErr'(k)-r(k) \quad (2)$$

At sted 314, while still using a low bandwidth compensator 250, the system 18 issues a control effort to the motor/plant 13 based on the corrected position error signal PosErr(k) determined in step 313 according to formula (2). This process ultimately moves the read head, after a sufficient number of revolutions, to a steady state position where all of the interim wedge runout estimates r(k) of formula (1) are contained in the servo wedge entries of the learned runout table 280 rather than reflected in the raw position error signal PosErr'(k).

At step 315, the system updates the learned runout value in the appropriate servo wedge entry of the learned runout table 280, for use with the (k+N)th sample one revolution later, based on the interim wedge runout estimate r(k) and the average value of learned runout RRODC (i.e. the amount by which the read head is presently estimated to be offset from actual servo track center when it started the current revolution, based on the servo wedge entries updated during the prior revolutions). The operation of step 315 may be summarized by the following formula:

$$TblRRO(k+N)=TblRRO(k)-RRODC \quad (3)$$

At sted 316, the system updates the RROSum variable, corresponding to the sum of the learned RRO from the servo wedges in the current revolution, by adding the current wedge's learned runout value contained in the runout table 280, just updated in step 315, to the existing value of the RROSum variable, as follows:

RROSum=RROSum+TblRRO(k+N) (4)

At step 316a, the system increments the wedge# by one.

At step 317, the system looks to see whether or not the current wedge# equals WedgeStart (see Step 309, above). If the wedge# is not equal to WedgeStart, we need more wedges to complete the revolution and processing continues with step 318. If wedge# is equal to WedgeStart, we have seen all of the wedges in one revolution and processing continues with step 319.

At step 318, being in the middle of a revolution, the system waits for the next wedge and then repeats steps 311–317 above.

At step 319, having just complete an entire revolution, the system determines the average value of the DC component of RRO by dividing the value of RROSum that was accumulated during the revolution (see step 316) by the number of servo wedges in each track, i.e. RRODC=RROSum/N. The RRODC value is then used to adjust the update of the servo wedge entries of the runout table 280 at step 315 during the subsequent revolution. The RROSum variable is then reset to zero so that the RROSum variable may be evaluated during the next revolution based on the current values in the runout table 280. The value of RRODC and RROSum will approach zero given enough revolutions and assuming a large number of servo wedges with servo fields that are positioned randomly to either side of the servo track center such that the average deviation from track center is zero.

At step 324 (preferred embodiment), the system uses conventional methods to adaptively extract disturbances at one and two times the fundamental spin frequency, i.e. at 1F and 2F, so that such values are not learned. The 1F disturbances correspond to runout from a disk being rotated off-axis. The 2F disturbances correspond to runout from rotating a disk having a "potato chip" shape. The 1F and 2F frequencies must be extracted because such disturbances are likely to change. The 1F and 2F components may be canceled onhe-fly, as proposed here, or after the learned runout table 280 is assembled, as proposed below. The steps corresponding to these two options are identified by dashed lines in FIG. 4. The on-the-fly approach is preferred because it permits the compensator's open loop bandwidth to be higher, as described earlier, which permits the drive to do other things during IBI while learning RRO.

At steps 320 and 321, the system decrements the revolution factor RevLambda by one, i.e. RevLambda= RevLambda−1, and then checks to see if RevLambda equals zero. If RevLambda is not equal to zero, then we have more revolutions to go and processing continues with step 318. If RevLambda is equal to zero, we have done all of the required revolutions, and processing continues with step 322.

At step 322, if desired (as in the preferred embodiment), the system decides whether to change the learning and revolution factors or to stop learning. This option permits the system to develop the runout values in the learned runout table 280 with multiple, back to back learning phases that uses different learning factors. The use of different learning factors may be desirable, for instance, in order to coarsely estimate the runout values and to then fine tune them. It may be faster, in other words, to rapidly find and shave off some of the worst wedge runouts with a relatively large $\lambda$ and to then come back and smooth everything out with a relatively small $\lambda$.

At step 323, the system reinitializes the learning parameters if the decision at step 322 was to "change."

At step 324 (Alternative Embodiment), the system extracts disturbances at one and two time the fundamental spin frequency, i.e. the "1F" and "2F" information, from the learned runout table 280. This may be accomplished using conventional DFT techniques that are well known to those of ordinary skill in the art. This use of conventional DFT extraction at this point is desirable because we learned about disturbances at fundamental and harmonic frequencies from 1F to $f_s/2$ (where $f_s$ is the wedge sampling frequency equal to N*F), a range that includes the 1F and 2F contributions, and because the 1F and 2F components can change with time and temperature. There would be a 1F component, for example, if the disk pack shifted relative to the motor spindle after servowriting. We do not want to learn this 1F shift because it may change again. The desired end result of step 324, therefore, is a learned runout table 280 having N wedge entries with estimate runout values that should remain fixed and relevant for the life of the drive.

At step 325, the system saves the learned runout table 280 by writing the entries to the disk (the preferred way) or by writing them directly or indirectly to a memory means such as RAM. These various methods are discussed below.

Learned RRO Storage and Usage Methods

After learning all or part of the runout information for tracks on a given disk, there are several different options for storing that data for later use in canceling the runout during track follow operation.

Figure 7:
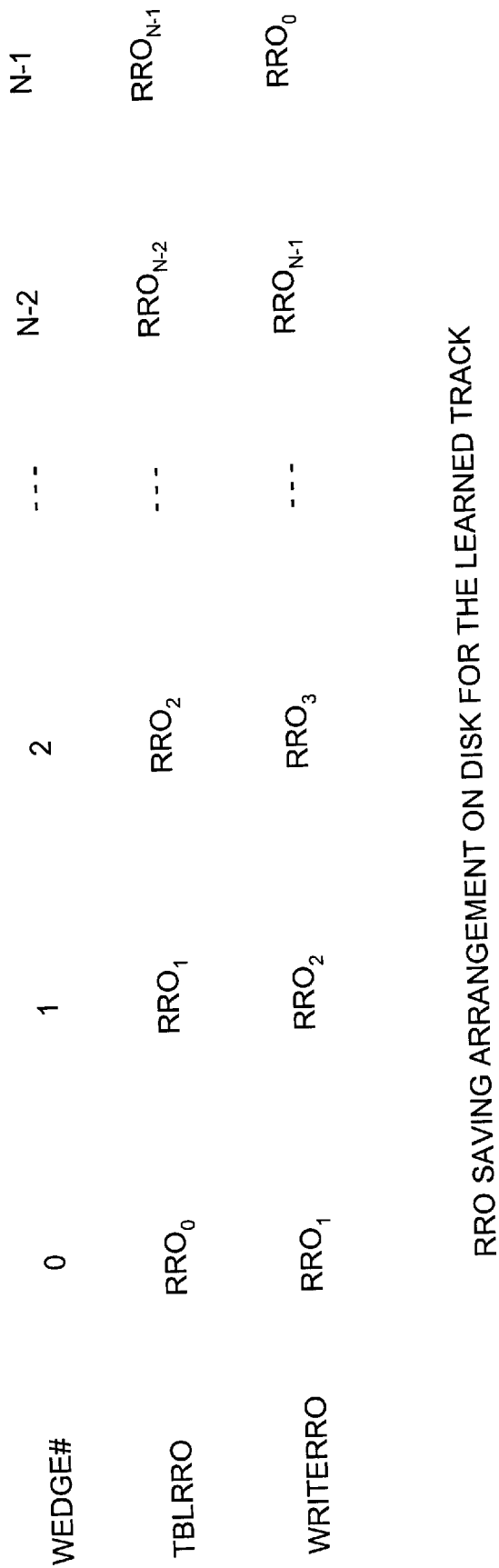
FIG. 7 is a table showing a preferred arrangement of saving repeatable runout values to each track of the disk wherein the servo wedge entries $RRO_0$ to $RRO_{N-1}$ from the runout table 280 are written one wedge in advance for use in canceling the RRO of the upcoming wedge, $RRO_2$ being written to wedge#1, $RRO_3$ being written to wedge#2, and so forth.

In the preferred approach, hardware and space permitting, the servo wedge entries of the runout table 280 for each particular track, are saved to the wedge entries of the track. In this embodiment, therefore, the servo wedge entries are shifted one servo wedge ahead, so that the servo control system will have the runout values available for canceling the runout of an upcoming wedge. FIG. 7, for example, illustrates the just described saving arrangement. As shown therein, the runout values contained within the runout table 280, are saved to physical wedges one wedge in advance. The runout value $RRO_1$ associated with wedge#1 for example, is saved to wedge#0.

It may be desirable to store the runout information in another format. If, for example, the hardware would not permit the writing and retrieval of the runout from each servo wedge as desired, or in order to make more space available for the storage of user data. The inventors contemplate, for example, that the runout data may be stored to unused cylinders called "negative cylinders" located outside of cylinder 0. In such case, it would require not only storing the wedge number, but also the cylinder number. It may also be desirable, given this approach, to store only a limited number of runout information so as to repair only the worst "problem wedges" which might be defined as a wedge which comes from a track which has a PES that exceeds a PES threshold and has a runout value that exceeds a RRO threshold. In this latter case, where the sum of all the runout information is stored in other cylinders, it would be desirable to load that data into RAM during power-off for use by the servo control system.

Finally, it may be possible to simply store the runout information associated with some or all of the servo wedges into a nonvolatile memory means such as battery backed up RAM, ROM and so on.

Figure 16:
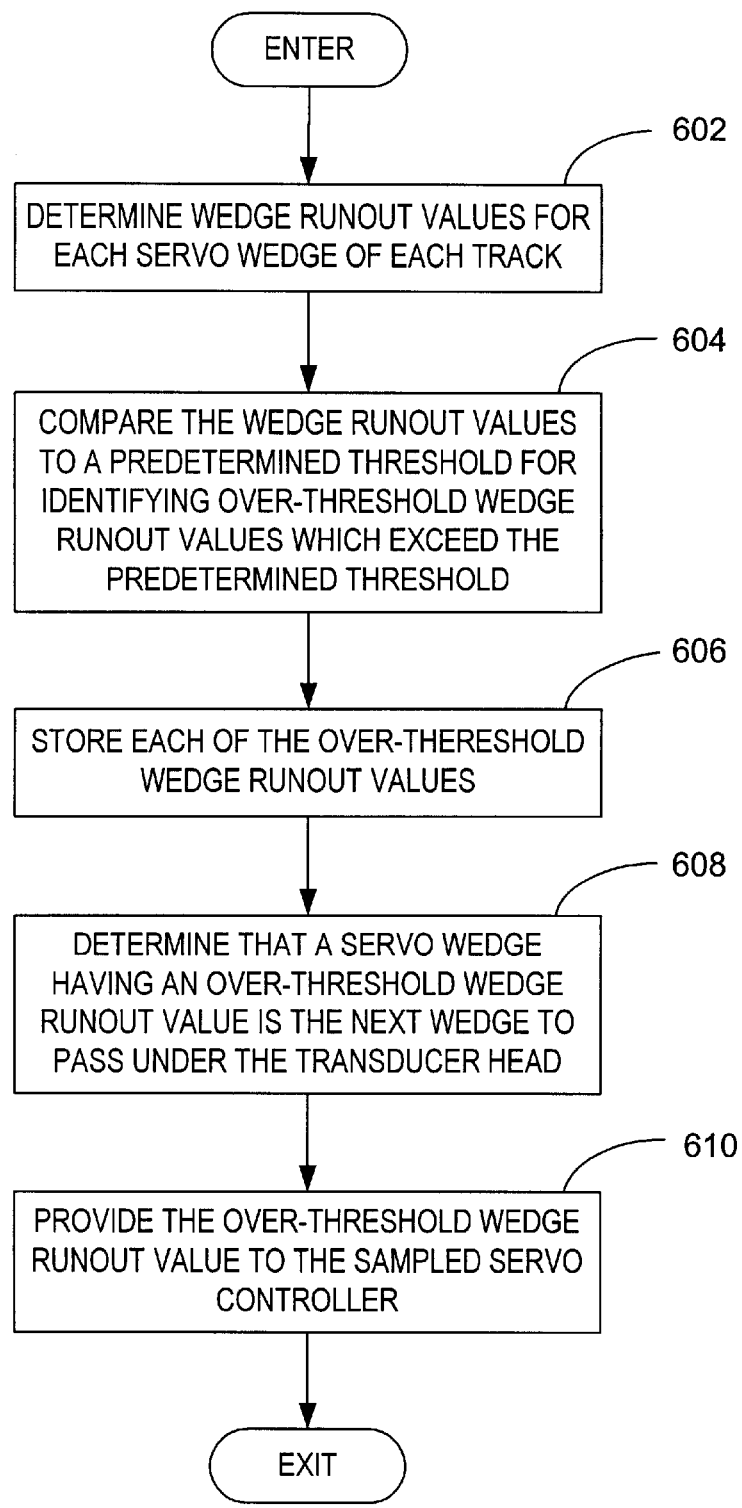
FIG. 16 is a block diagram of a method for selectively correcting reeatable runout in a disk drive, according to the invention.
Figure 17:
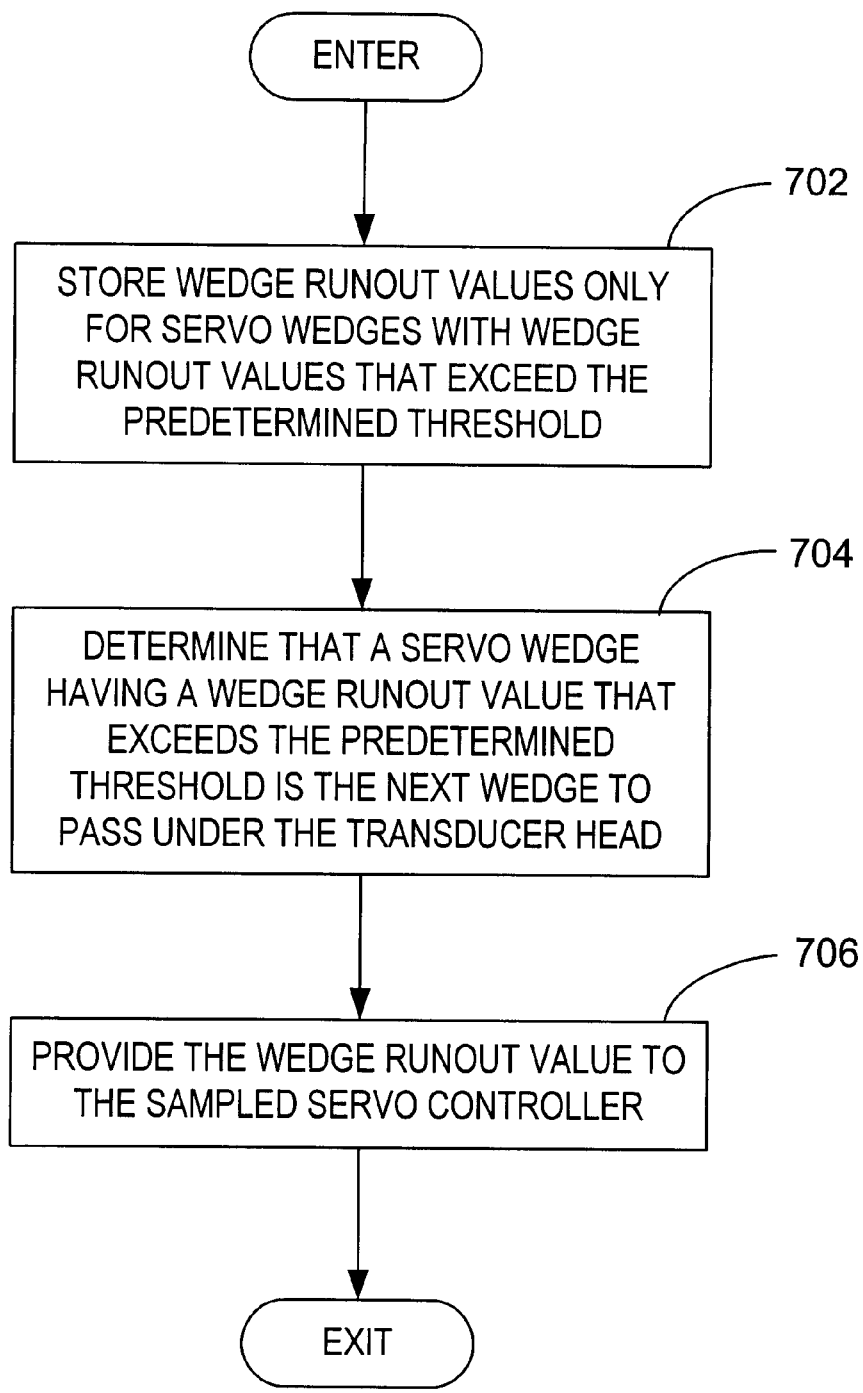
FIG. 17 is a block diagram of a another method for selectively correcting repeatable runout in a disk drive, according to the invention.

The invention may be embodied in a method for selectively correcting repeatable renout in a disk drive 10 (FIG. 1) having a magnetic disk 12 whith a plurality of tracks that each have a cylinder address and a plurality of servo wedges. The disk drive includes a menas (spindle motor 13) for rotating the magnetic disk at a rotation frequency, a transducer head 140 (FIG. 1A) mounted on an actuator 30, a means (VCM 50) for moving the actuator, and a sampled servo controller (within controller circuit board 14) for reading signals from the transducer head and for providing servo compensation signals to the actuator moving means for positioning the transducer head over the magnetic disk. In an embodiment of the method shown in FIG. 16, wedge runout values are determined for each servo wedge of each track (step 602). The wedge runout values are compared to a predetermined threshold for identifying over-threshold wedge runout values which exceed the predetermined threshold (step 604). Each of the over-threshold wedge runout values is stored (step 606). Upon determination that a servo wedge having an over-threshold wedge runout value is the next wedge to pass under the transducer head (step 608), the over-threshold wedge runout value is provided to the sampled servo controller (step 610). In another embodiment of the method shown in FIG. 17, wedge runout values are stored only for servo wedges with wedge runout values that exceed the predetermined threshold (step 702). Upon determination that a servo wedge having a wedge runout value that exeeds the predetermined threshold is the next wedge to pass under the transducer head (step 704), the wedge runout value is provided to the sampled servo controller (step 706).

MtaLab Simulation

Figure 8:
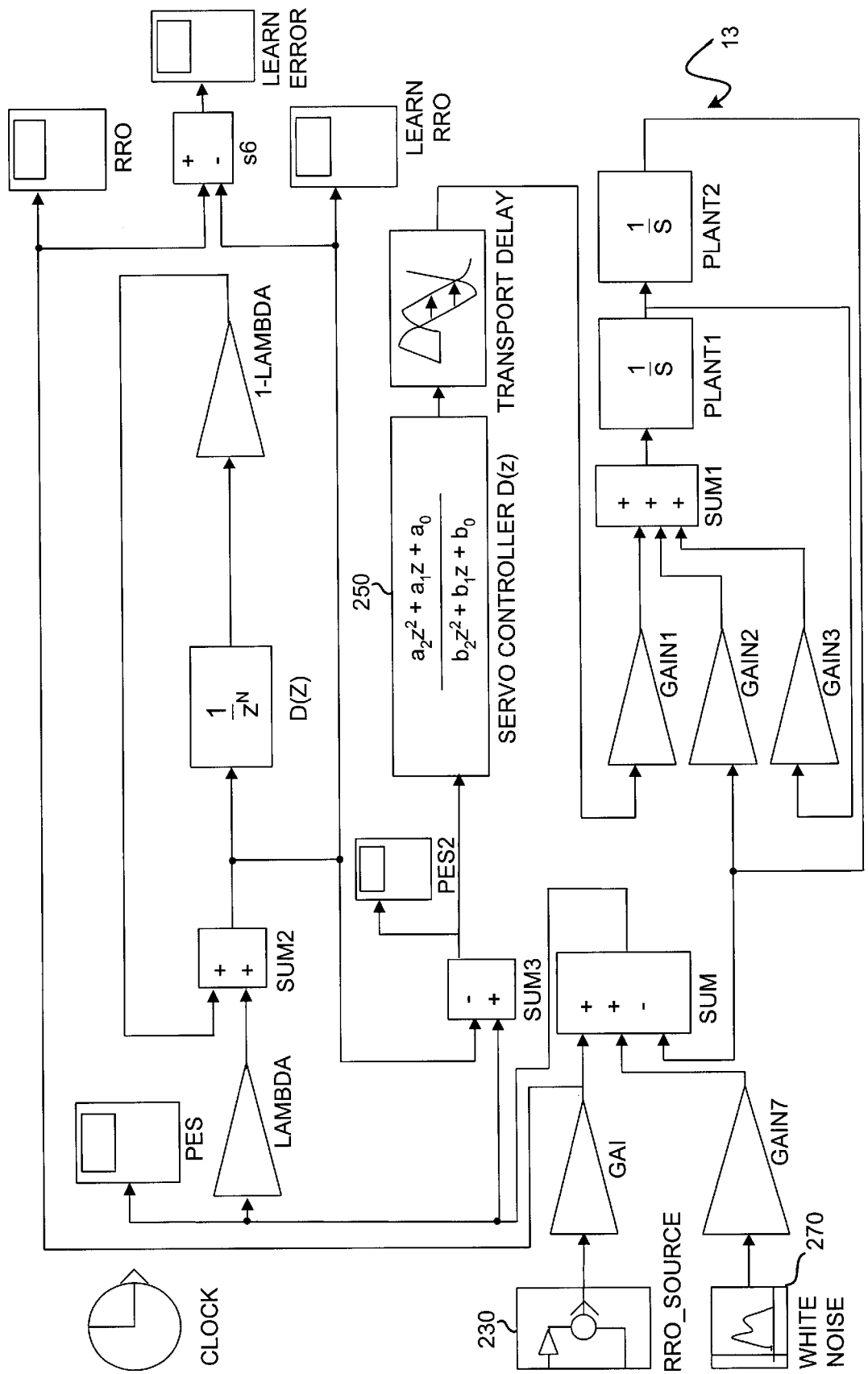
FIG. 8 shows the graphical input screen for a simulation of the present invention as defined in the Simulink module of MathLab.
Figure 9:
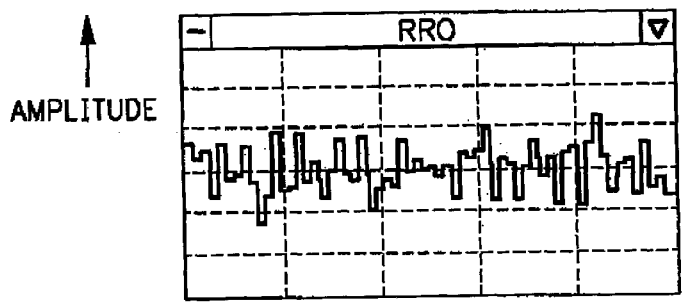
FIG. 9 shows the RRO values 230 of a hypothetical track used to drive the simulation of FIG. 8.

The operation and benefits of the present invention can be better appreciated by reviewing FIG. 8 which shows the input screen of a MatLab/Simulink simulation (trademarks of The Math Works Incorporated), FIG. 9 which shows a hypothetical RRO input, and FIGS. 10 and 11 which show the learned runout and corrected PES after one revolution (10A, 10B) and after numerous revolutions (11A, 11B).

FIG. 8, in particular, represents the graphical input to MatLab. As shown, the inputs to the system include an rro_source 230 and a white noise source 270. The runout values of the rro_source 230 are shown graphically in FIG. 9 pursuant to the display icon labeled RRO at the top right of FIG. 8. Also shown therein is a Servo Controller D(z) which represents the compensator 250 that may be characterized with coefficients $a_2$, $a_1$, $a_0$, $b_2$, $b_1$, $b_0$ that are set, in a known manner, to achieve a desired open loop bandwidth. The gain variables and blocks Plant 1 and Plant 2 represent the motor/plant 13 that is driven by the compensator 250.

Figure 10A:
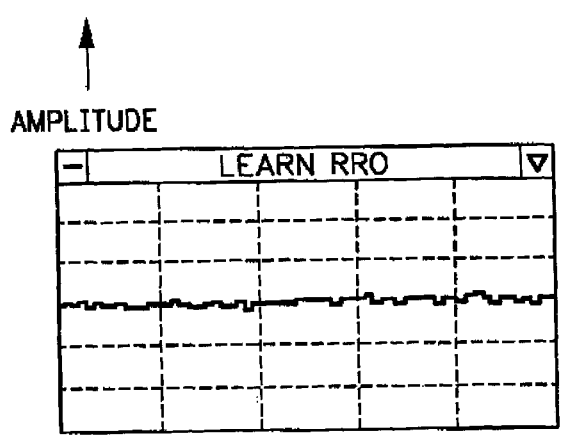
FIG. 10A shows the learned RRO values in the runout table 280 after only one revolution.
Figure 11A:
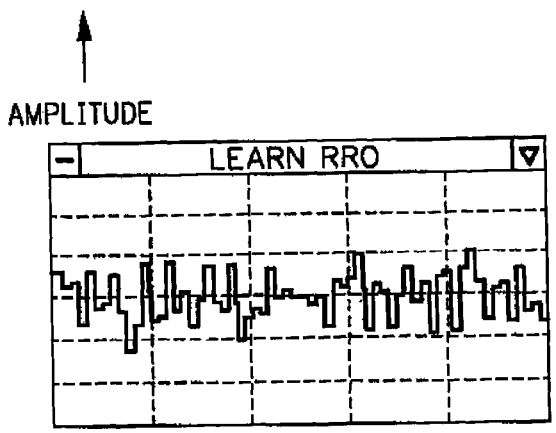
FIG. 11A shows the learned RRO values in the runout table 280 match the actual runout values of FIG. 9 after a complete learning cycle comprising RevLambda revolutions.
Figure 10B:
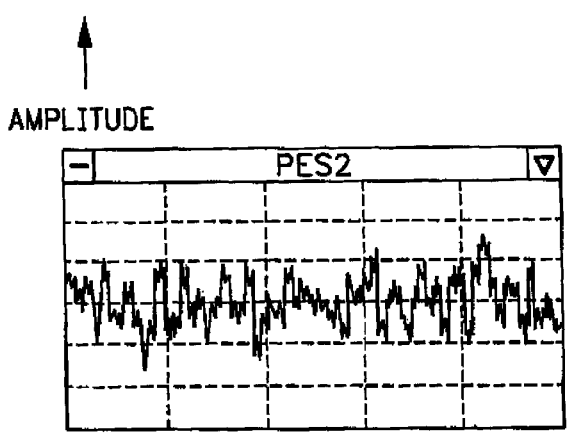
FIG. 10B shows the corrected position error signal PosErr (k) after only one revolution.
Figure 11B:
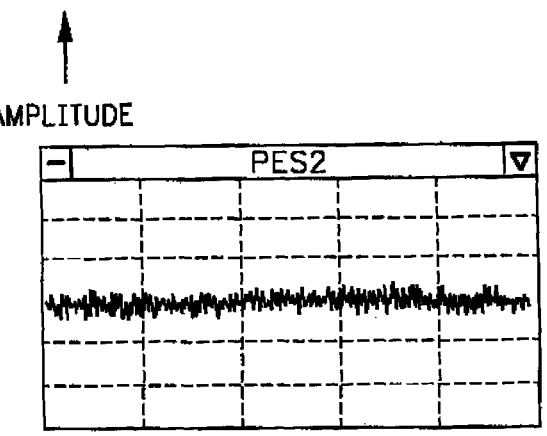
FIG. 11B shows the corrected position error signal PosErr (k) is reduced to only random white noise after a complete learning cycle comprising RevLambda revolutions.

FIG. 10A shows the learned RRO values in the runout table 280 after only one revolution and FIG. 10B shows the corrected position error signal PosErr(k), labeled PES2 in FIG. 8, after only one revolution;

FIG. 11A shows the learned RRO values and corrected position error signal PosErr(k) after a complete learning cycle comprising RevLambda revolutions. In the simulation, the number of learning cycles is essentially infinite and is not specified. As shown in FIGS. 11A and 11B, the values in the runout table 280 (FIG. 11A) ultimately match the actual runout values of FIG. 9 and the corrected position error signal PosErr(k) is reduced to the random white noise that is present in all systems.

Real Life Results

Figure 14:
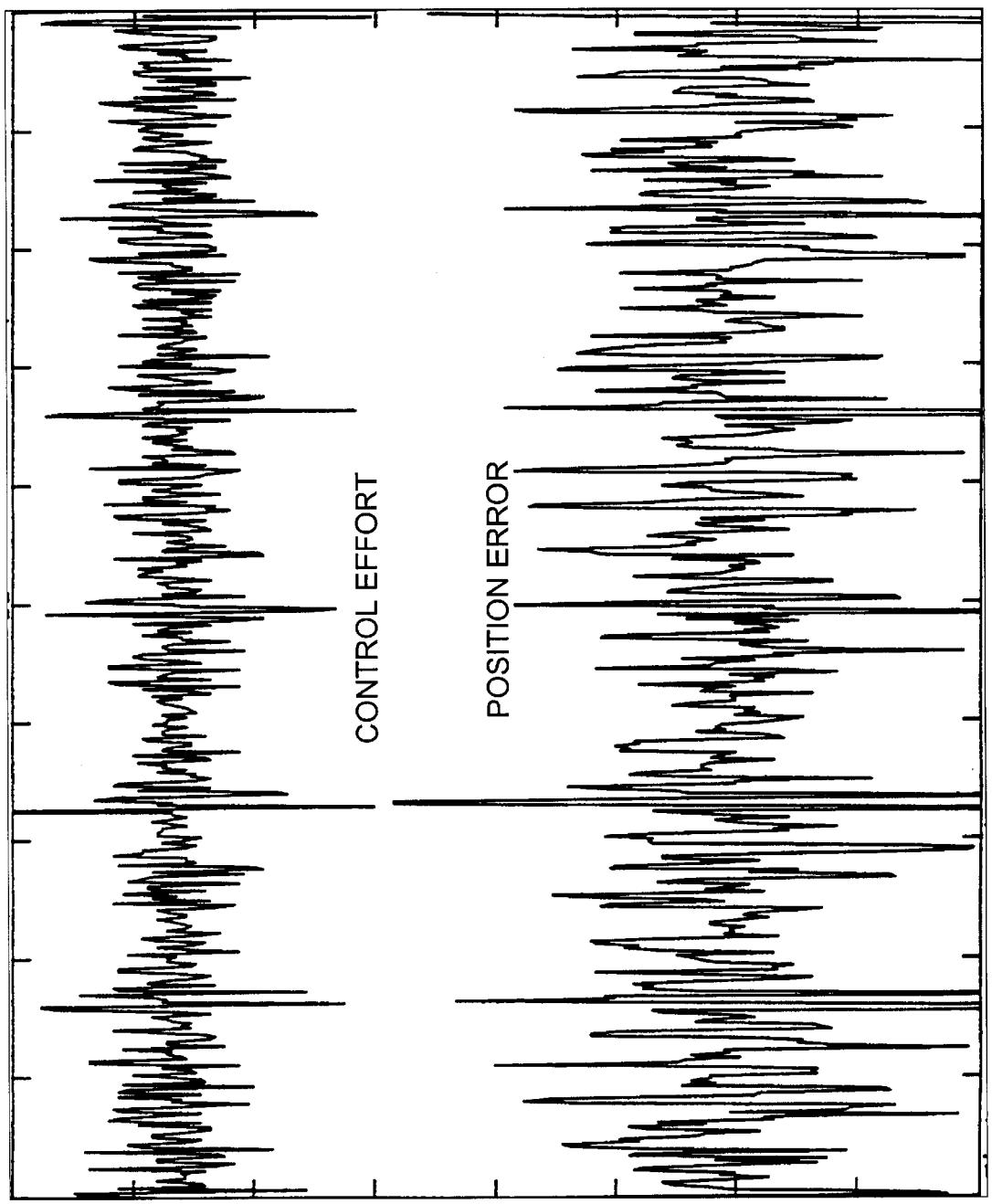
FIG. 14 is a graph of the Position Error Signal (bottom) and Control effort (top) in a conventional drive that does not remove the RRO in accordance with the present invention.

FIG. 14 is a graph of the PES (bottom) and "DAC output" or control effort (top) while following a track in a conventional disk drive that does not remove the RRO in accordance with the present invention. As evidenced by the widely varying PES (bottom), the tracking is relatively large in magnitude and erratic because the servo control system is forced to follow spurious servo fields that are randomly positioned on either side of the perfect servo track. According, the control effort (top) needed to keep the head on track is proportionally high and erratic.

Figure 15:
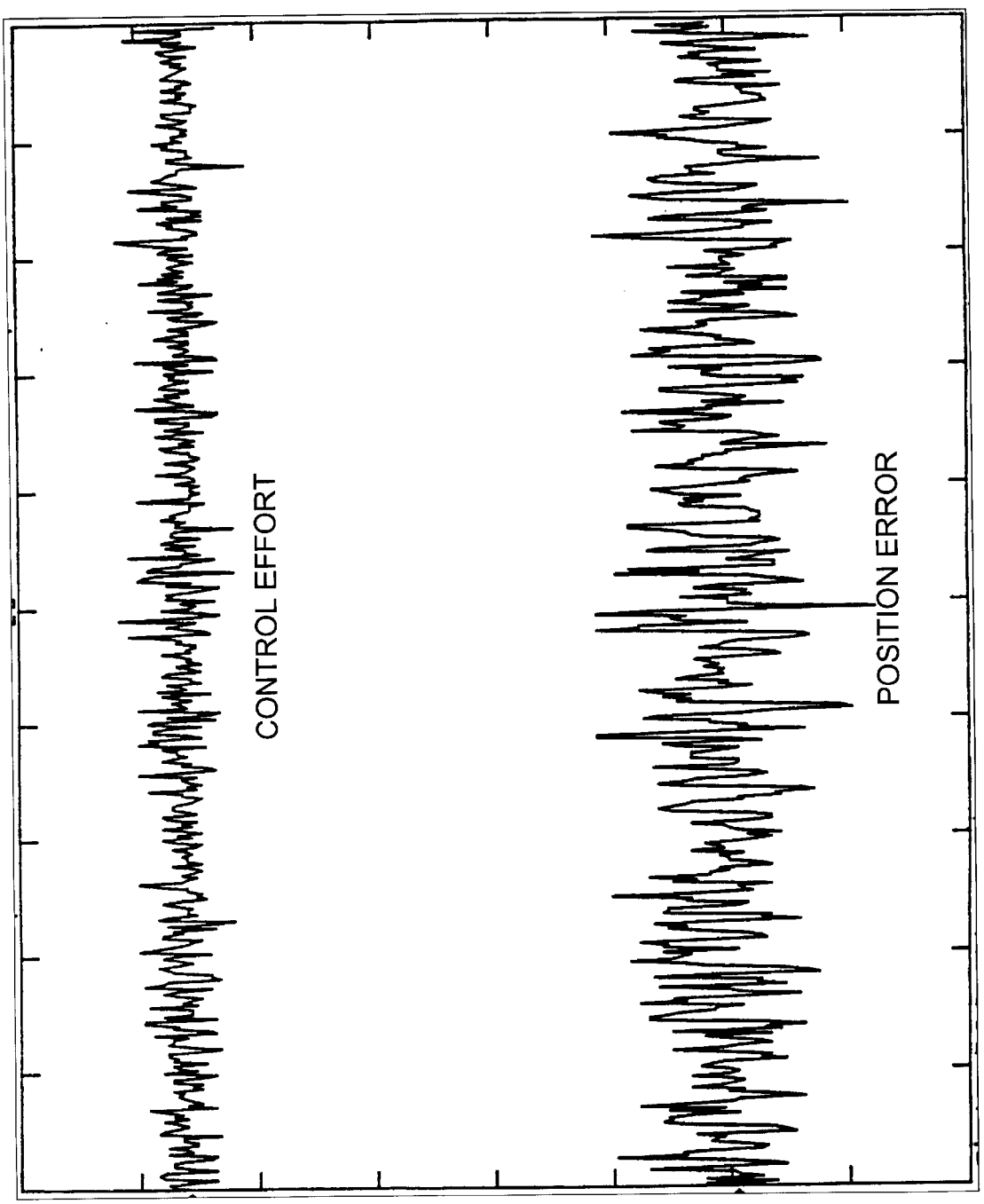
FIG. 15 is a graph of the Position Error Signal (bottom) and Control effort (top) in a drive that removes the RRO in accordance with the present invention which shows a substantially reduced PES and control effort relative to FIG. 14.

FIG. 15 shows signals of a type similar to those of FIG. 14, but for a track in a drive in which RRO was learned and removed in accordance with this invention. As shown, the variation in the PES (bottom) is dramatically reduced in magnitude as compared with FIG. 14. As a result, the corresponding control effort (top) required to stay on track is also reduced.

Simplified Example of RRO Learning

FIGS. 12-0 and 12-1 and FIG. 13, taken as a group, illustrate a simple example of RRO cancellation in a hypothetical disk 12. More particularly, FIGS. 12-0 and 12-1 graphically show two successive revolutions, an initial rev (Rev 0) and a subsequent rev (Rev 1), and FIG. 13 shows the values developed in the several steps described above for these two and several more revs.

The hypothetical disk 12 has four sectors and corresponding servo wedges 0–3 that are schematically shown as radiating spokes at the leading edge of each sector. In this particular case, therefore, N=4. The servo control system (not shown) controls the HSA 20 in order to keep the transducer head 140 over a particular servo track 200. The servo track 200 is defined by the servo field of each servo wedge 0–3 (each one shown as a dot, as in FIGS. 2A and 2B). The servo fields are distorted by servo written RRO, however, such that in this particular case, three of the four servo fields are mispositioned relative to the ideal servo track 200.

Since it has four servo wedges, each track of the hypothetical drive provides four actual RRO values 30 $RRO_0$–$RRO_{N-1}$ (see FIG. 3) per revolution when detected by a head traveling over the track center of the ideal servo track 200 (these values were made up for this example, are not normally known in advance and, in fact, are the values we want to learn):

| Actual | $RRO_0$ | $RRO_1$ | $RRO_2$ | $RRO_3$ |
|---|---|---|---|---|
| | -1 | -1 | 0 | +2 |

At steps 301–303, the learned runout table TblRRO 280, the variable RROSum, and the variable RRODC are initialized as follows:

| TblRRO | $RRO_0$ | $RRO_1$ | $RRO_2$ | $RRO_3$ |
|---|---|---|---|---|
| | 0 | 0 | 0 | 0 |

| RROSum | 0 |
|---|---|

| RRODC | 0 |
|---|---|

At step 304, the systems sets the learning factor λ to 0.5 (arbitrarily chosen for this example) and sets the revolution factor RevLambda is set to 20 (also arbitrarily chosen for this example):

λ  | 0.5 |

RevLambda | 20 |

At steps 305–308, the system track follows with high bandwidth compensation, followed by low bandwidth compensation, such that mechanical biases are detected and compensated for and so that the read head 140 is substantially on track center as it approaches wedge#0 as shown in FIG. 5-0.

At step 309, the Wedge# and WedgeStart variables are both set to 1, i.e.

Wedge# | 1 |

WedgeStart | 1 |

FIRST SAMPLE k=1 (Rev0. Wedge#1)

Figures 1, 12:
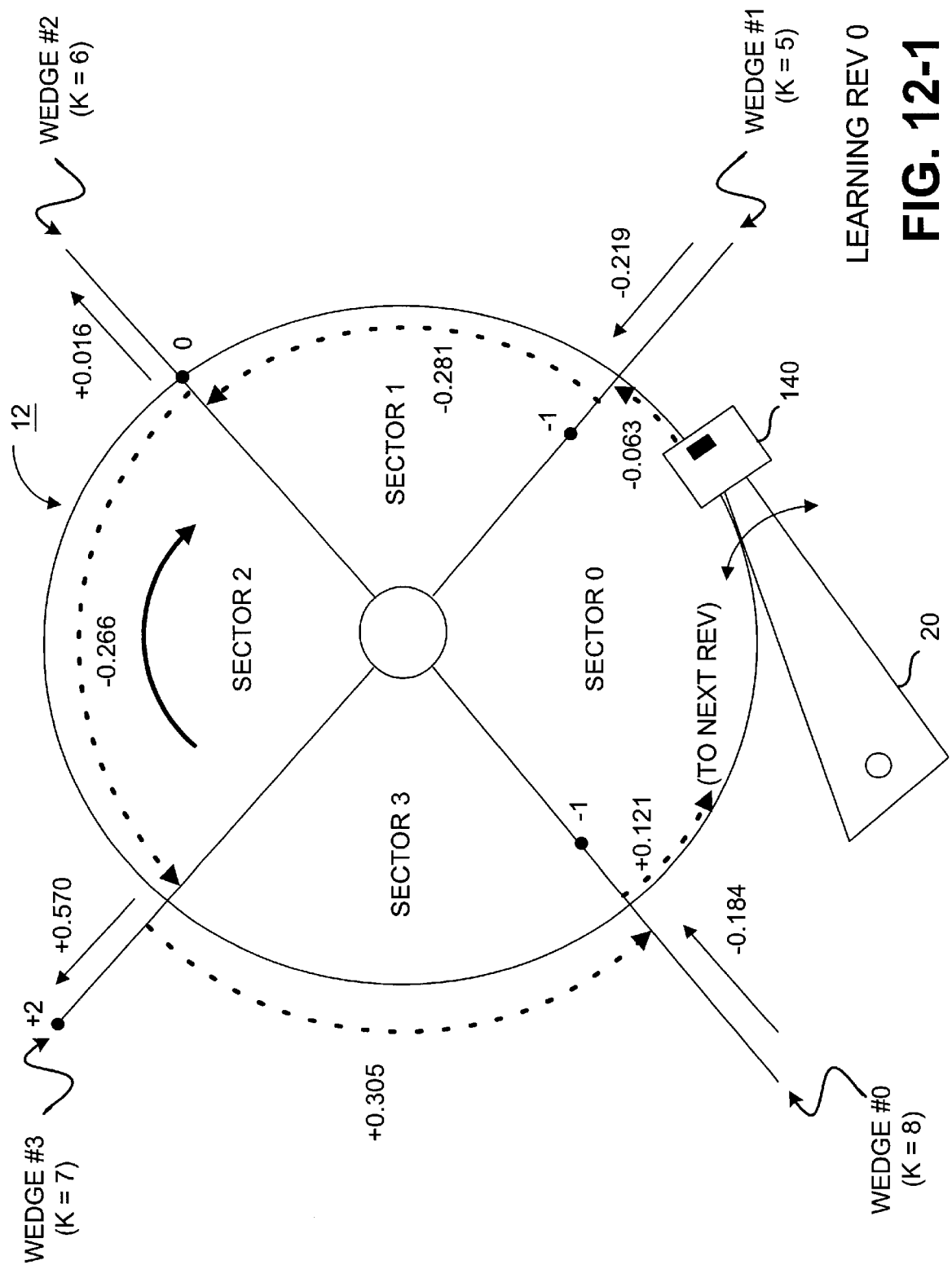

At step 311, as noted in the vicinity of (k=1) on FIG. 12-0, the system reads the raw position error signal PosErr'(1) associated with wedge#1, which equals the distance between the servo field of Wedge#1 (−1) and the head (0), i.e.

PosErr'(1)=−1.

At step 312, the system determines the interim wedge runout estimate r(1) as follows:

r(1)=λ*PosErr'(1)+(1−λ)*TblRRO(k)

r(1)=0.5*(−1)+0.5*(0)

r(1)=−0.5

At step 313, the system determines the corrected position error signal PosErr(1) based on formula (2), i.e.

PosErr(1)=PosErr'(1)−r(1)

PosErr(1)=−1−(−0.5)

PosErr(1)=−0.5

At step 314, the system issues a control effort based on the corrected position error signal PosErr(1) such that the head is moved −0.5 displacement units, i.e. inward toward the servo field of wedge#1 which is positioned at −1. The head is now traveling on a −0.5 arc as shown.

At step 315, the system updates the appropriate servo wedge entry (here wedge#1) in the learned RRO table 280 for use during the (k+N)th sample on the next revolution, using formula (3), as follows:

TblRRO(k+N)=r(k)−RRODC

TblRRO(5)=r(1)−RRODC

TblRRO(5)=−0.5−0

TblRRO(5)=−0.5

At step 316, the system adds the interim wedge runout estimate r(1) to the sum of the learned RRO in the current revolution using formula (4), as follows:

RROSum | 0 |

RROSum = RROSum + TblRRO(k + N)
RROSum = 0 + TblRRO(5)
RROSum = 0 + (−0.5)
RROSum = −0.5

RROSum | −0.5 |

At step 316a, the system increments wedge# from 1 to 2:

Wedge# | 2 |

At step 317, the system checks to see if Wedge# (now 2) is equal to WedgeStart (1). At this point, they are not equal and processing continues with step 318.

At step 318, the system waits for the next wedge (2) and then repeats the process loop from steps 311 to 317.

SECOND SAMPLE k=2 (Rev0. Wedge#2)

At step 311, the system reads the raw position error signal PosErr'(2) associated with wedge#2 which equals the distance between the servo field of Wedge#2 (0) and the head (−0.5), i.e.:

PosErr'(2)=+0.5

At step 312, the system determines the interim wedge runout estimate r(2) as follows:

r(k)=λ*PosErr'(k)+(1−λ)*TblRRO(k)

r(2)=λ*PosErr'(2)+(1−λ)*TblRRO(2)

r(2)=0.5*(+0.5)+0.5*0 r(2)=0.25

At step 313, the system determines the compensated position error PosErr(2) based on formula (2), i.e.:

PosErr(k)=PosErr'(k)−r(k)

PosErr(2)=PosErr'(2)−r(2)

PosErr(2)=0.5−0.25

PosErr(2)=+0.25

At sten 314, the system issues a control effort based on the corrected position error signal PosErr(2) such that the head is moved +0.25 displacement units, i.e. outward away from the −0.5 arc toward the servo field of wedge#2 which is positioned at 0. The head is now traveling on a −0.25 arc.

At step 315, the system updates the appropriate servo wedge entry (here wedge#2) in the learned RRO table 280 for use during the (k+N)th sample on the next revolution, using formula (3), as follows:

TblRRO(k+N)=r(k)−RRODC

TblRRO(2+4)=r(2)−RRODC

TblRRO(6)=r(2)−RRODC

TblRRO(6)=0.25−0

TblRRO(6)=0.25

At step 316, the system updates the sum of the learned RRO in the current revolution using formula (4), as follows:

RROSum | -0.5 |

RROSum = RROSum + TblRRO(k + N)
RROSum = -0.5 + TblRRO(6)
RROSum = -0.5 + -0.25
RROSum = -0.25

RROSum | -0.25 |

At step 316a, the system increments wedge # from 2 to 3:

Wedge# | 3 |

At step 317, the system checks to see if Wedge# (now 3) is equal to WedgeStart (1). At this point, they are not equal and processing continues with step 318.

At step 318, the system waits for the next wedge (3) and then repeats the process loop from steps 311 to 317.

THIRD SAMPLE k=3 (Rev0, Wedge#3)

At step 311, the system reads the raw position error signal PosErr'(3) associated with wedge#3, which equals the distance between the servo field of Wedge#3 (+2) and the head (−0.25), i.e.: PosErr'(3)=+2.25

At step 312, the system determines the interim wedge runout estimate r(3) as follows:

$r(k)=\lambda*PosErr'(k)+(1-\lambda)*TblRRO(k)$
$r(3)=\lambda*PosErr'(3)+(1-\lambda)*TblRRO(3)$
$r(3)=0.5*(2.75)+0.5*(0)$
$r(3)=1.125$ At step 313, the system determines the corrected position error signal PosErr(3) based on formula (2), i.e.:

$PosErr(k)=PosErr'(k)-r(k)$
$PosErr(3)=PosErr'(3)-r(3)$
$PosErr(3)=2.125-1.125$
$PosErr(3)=1.125$

At step 314, the system issues a control effort based on the corrected position error signal PosErr(3) such that the head is moved +1.125 displacement units, i.e. outward away from the −0.25 arc toward the servo field of wedge#3 which is positioned at +2. The head is now traveling on a +0.875 arc.

At step 315, the system updates the appropriate servo wedge entry (here wedge#3) in the learned RRO table 280 for use during the (k+N)th sample on the next revolution, using formula (3), as follows:

$TblRRO(k+N)=r(k)-RRODC$
$TblRRO(3+4)=r(3)-RRODC$
$TblRRO(7)=r(3)-RRODC$
$TblRRO(7)=1.125-0$
$TblRRO(7)=1.125$

At step 316, the system updates the sum of the learned RRO in the current revolution using formula (4), as follows:

RROSum | -0.25 |

RROSum = RROSum + TblRRO(k + N)
RROSum = -0.25 + TblRRO(7)
RROSum = -0.25 + 1.125
RROSum = 0.875

RROSum | 0.875 |

At step 316a, the system increments wedge # from 3 to 0:

Wedge# | 0 |

At step 317, the system checks to see if wedge# (now 0) is equal to WedgeStart (1). At this point, they are not equal and processing continues with step 318.

At step 318, the system waits for the next wedge and then repeats the process loop from steps 311 to 317.

FOURTH SAMPLE k=4 (Rev0, Wedge#0)

At step 311, the system reads the raw position error signal PosErr'(4) associated with wedge#0, which equals the distance between the servo field of Wedge#0 (−1) and the head (+0.875), i.e.:

$PosErr'(4)=1.875$

At step 312, the system determines the interim wedge runout estimate r(4) as follows:

$r(k)=\lambda*PosErr'(k)+(1-\lambda)*TblRRO(k)$
$r(4)=\lambda*PosErr'(4)+(1-\lambda)*TblRRO(4)$
$r(4)=0.5*(-1.875)+0.5*0$
$r(4)=-0.938$ At step 313, the system determines the corrected position error signal PosErr(4) based on formula (2), i.e.:

$PosErr(k)=PosErr'(k)-r(k)$
$PosErr(4)=PosErr'(4)-r(4)$
$PosErr(4)=-1.875-(-0.938)$
$PosErr(4)=-0.938$

At step 314, the system issues a control effort based on the corrected position error signal PosErr(4) such that the head is moved −0.938 displacement units, i.e. inward away from the +0.875 arc toward the servo field of wedge#0 which is positioned at −1. The head is now traveling on a −0.063 arc, as shown near wege#0 in FIGS. 12-0 and 12-1.

At step 315, the system updates the appropriate servo wedge entry (here wedge#0) in the learned RRO table 280 for use during the (k+N)th sample on the next revolution, using formula (3), as follows:

$TblRRO(k+N)=r(k)-RRODC$
$TblRRO(4+4)=r(4)-RRODC$
$TblRRO(8)=r(4)-RRODC$
$TblRRO(8)=-0.938+0$
$TblRRO(8)=-0.938$

At step 316, the system updates the sum of the learned RRO in the current revolution using formula (4), as follows:

RROSum | 0.875

RROSum = RROSum + TblRRO(k + N)
RROSum = 0.875 + TblRRO(4)
RROSum = 0.875 + (-0.938)
RROSum = -0.063

RROSum | -0.063

At step 316a, the system increments wedge # from 0 to 1:

Wedge# | 1

At step 317, the system checks to see if Wedge# (now 1) is equal to WedgeStart (1). At this point, they ARE equal and processing continues with step 319, rather than step 318.

PREPARE FOR SECOND REVOLUTION

At step 319, having just completed one whole revolution, the system determines the average RRO value RRODC according to the formula:

RRODC=RROSum/N
RRODC=−0.063/4
RRODC=−0.016

The system then clears RROSum to zero in order to accumulate fresh runout values during the next revolution.

At step 320, the system decrements RevLambda (now 15) by one, i.e. RevLambda=RevLambda−1, and then checks to see if RevLambda equals zero. If RevLambda is not equal to zero, as here, then we have more revolutions to go and processing continues with step 318.

At step 318, the system waits for the next wedge (1, again) and then repeats the process loop from steps 311 to 317.

FIFTH SAMPLE k=5 (Rev1, Wedge#1)

At step 311, as noted in the vicinity of (k=5) on FIG. 12-1, the system reads the raw position error signal PosErr'(5) associated with wedge#1, which equals the distance between the servo field of Wedge#1 (−1) and the head (−0.063), i.e.

PosErr'(5)=−0.938.

At step 312, the system determines the interim wedge runout estimate r(5) as follows:

$r(k)=\lambda*PosErr'(1)+(1-\lambda)*TblRRO(k)$
$r(5)=0.5*(-0.938)+0.5*(-0.500)$
$r(5)=-0.719$ At step 313, the system determines the corrected position error signal PosErr(5) based on formula (2), i.e.:

PosErr(5)=PosErr'(5)−r(5)
PosErr(5)=−0.938−(−0.719)
PosErr(5)=−0.219

At step 314, the system issues a control effort based on the corrected position error signal PosErr(5) such that the head is moved −0.219 displacement units, i.e. inward toward the servo field of wedge#1 which is positioned at −1. The head is now traveling on a −0.281 arc as shown.

At step 315, the system updates the appropriate servo wedge entry (here wedge#1) in the learned RRO table 280 for use during the (k+N)th sample on the next revolution, using formula (3), as follows:

TblRRO(k+N)=r(k)−RRODC
TblRRO(9)=r(5)−RRODC
TblRRO(9)=−0.719−(−0.016)
TblRRO(9)=−0.703

At step 316, the system adds the interim wedge runout estimate r(9) to the sum of the learned RRO in the current revolution using formula (4), as RROSum | 0

RROSum = RROSum + TblRRO(k + N)
RROSum = 0 + TblRRO(9)
RROSum = 0 + (−0.703)
RROSum = −0.703

RROSum | -0.703

At step 316a, the system increments wedge # from 1 to 2:

Wedge# | 2

At step 317, the system checks to see if Wedge# (now 2) is equal to WedgeStart (1). At this point, they are not equal and processing continues with step 318.

At step 318, the system waits for the next wedge (2) and then repeats the process loop from steps 311 to 317.

SIXTH SAMPLE k=6 (Rev1, Wedge#2)

At step 311, the system reads the raw position error signal PosErr'(6) associated with wedge#2 which equals the distance between the servo field of Wedge#2 (0) and the head (−0.281), i.e.:

PosErr'(6)=+0.281

At step 312, the system determines the interim wedge runout estimate r(6) as follows:

$r(k)=\lambda*PosErr'(k)+(1-\lambda)*TblRRO(k)$
$r(6)=\lambda*PosErr'(6)+(1-\lambda)*TblRRO(6)$
$r(6)=0.5*(+0.281)+0.5*(0.250)$
$r(6)=0.266$ At step 313, the system determines the compensated position error PosErr(6) based on formula (2), i.e.:

PosErr(k)=PosErr'(k)−r(k)
PosErr(6)=PosErr'(6)−r(6)
PosErr(6)=0.281−0.266
PosErr(6)=+0.016

At step 314, the system issues a control effort based on the corrected position error signal PosErr(6) such that the head is moved +0.016 displacement units, i.e. outward away from the −0.281 arc toward the servo field of wedge#2 which is positioned at 0. The head is now traveling on a −0.266 arc.

At step 315, the system updates the appropriate servo wedge entry (here wedge#2) in the learned RRO table 280 for use during the (k+N)th sample on the next revolution, using formula (3), as follows:

TblRRO(k+N)=r(k)−RRODC
TblRRO(6+4)=r(6)−RRODC
TblRRO(10)=r(6)−RRODC
TblRRO(10)=0.266−(−0.016)
TblRRO(10)=0.281

At step 316, the system updates the sum of the learned RRO in the current revolution using formula (4), as follows:

RROSum  | -0.703 |

RROSum = RROSum + TblRRO(k + N)
RROSum = -0.703 + TblRRO(10)
RROSum = -0.703 + 0.281
RROSum = -0.422

RROSum  | -0.422 |

At step 316a, the system increments wedge # from 2 to 3:

Wedge#  | 3 |

At step 317, the system checks to see if Wedge# (now 3) is equal to WedgeStart (1). At this point, they are not equal and processing continues 13 with step 318.

At step 318, the system waits for the next wedge (3) and then repeats the process loop from steps 311 to 317.

SEVENTH SAMPLE k=7 (Rev1, Wedge#3)

At step 311, the system reads the raw position error signal PosErr'(3) associated with wedge#3, which equals the distance between the servo field of Wedge#3 (+2) and the head (−0.266), i.e.:

PosErr'(7)=+2.266

At step 312, the system determines the interim wedge runout estimate r(7) as follows:

r(k)=λ*PosErr'(k)+(1−λ)*TblRRO(k)
r(7)=λ*PosErr'(7)+(1−λ)*TblRRO(7)
r(7)=0.5*(2.266)+0.5*(1.125)
r(7)=1.695

At step 313, the system determines the corrected position error signal PosErr(7) based on formula (2), i.e.:

PosErr(k)=PosErr'(k)−r(k)
PosErr(7)=PosErr'(7)−r(7)
PosErr(7)=2.266−1.695
PosErr(7)=0.570

At step 314, the system issues a control effort based on the corrected position error signal PosErr(7) such that the head is moved +0.570 displacement units, i.e. outward away from the −0.266 arc toward the servo field of wedge#3 which is positioned at +2. The head is now traveling on a +0.305 arc.

At step 315, the system updates the appropriate servo wedge entry (here wedge#3) in the learned RRO table 280 for use during the (k+N)th sample on the next revolution, using formula (3), as follows:

TblRRO(k+N)=r(k)−RRODC
TblRRO(7+4)=r(7)−RRODC
TblRRO(11)=r(7)−RRODC
TblRRO(11)=1.695−(−0.016)
TblRRO(11)=1.711

At step 316, the system updates the sum of the learned RRO in the current revolution using formula (4), as follows:

RROSum  | -0.422 |

RROSum = RROSum + TblRRO(k + N)
RROSum = -0.422 + TblRRO(11)
RROSum = -0.422 + 1.711
RROSum = 1.289

RROSum  | 1.289 |

At step 316a, the system increments wedge # from 3 to 0:

Wedge#  | 0 |

At step 317, the system checks to see if Wedge# (now 0) is equal to WedgeStart (1). At this point, they are not equal and processing continues with step 318.

At step 318, the system waits for the next wedge and then repeats the process loop from steps 311 to 317.

EIGHTH SAMPLE k=8 (Rev1, Wedge #0)

At step 311, the system reads the raw position error signal PosErr'(8) associated with wedge#0, which equals the distance between the servo field of Wedge#0 (−1) and the head (+0.305), i.e.:

PosErr'(8)=−1.305

At step 312, the system determines the interim wedge runout estimate r(4) as follows:

r(k)=λ*PosErr'(k)+(1−λ)*TblRRO(k)
r(8)=λ*PosErr'(8)+(1−λ)*TblRRO(8)
r(8)=0.5*(−1.305)+0.5*(−0.938)
r(8)=−1.121

At step 313, the system determines the corrected position error signal PosErr(8) based on formula (2), i.e.:

PosErr(k)=PosErr'(k)−r(k)
PosErr(8)=PosErr'(8)−r(8)
PosErr(8)=−1.305−(−1.121)
PosErr(4)=−0.184

At step 314, the system issues a control effort based on the corrected position error signal PosErr(8) such that the head is moved −0.184 displacement units, i.e. inward away from the +0.305 arc toward the servo field of wedge#0 which is positioned at −1. The head is now traveling on a +0.121 arc, as shown near wege#0 in FIG. 12-1.

At step 315, the system updates the appropriate servo wedge entry (here wedge#0) in the learned RRO table 280 for use during the (k+N)th sample on the next revolution, using formula (3), as follows:

TblRRO(k+N)=r(k)−RRODC
TblRRO(8+4)=r(8)−RRODC
TblRRO(12)=r(8)−RRODC
TblRRO(12)=−1.121−(−0.016)
TblRRO(12)=−1.105

At step 316, the system updates the sum of the learned RRO in the current revolution using formula (4), as follows:

RROSum | 1.289 |

RROSum = RROSum + TblRRO(k + N)
RROSum = 1.289 + TblRRO(8)
RROSum = 1.289 + (-1.105)
RROSum = 0.184

RROSum | 0.184 |

At step 316a, the system increments wedge # from 0 to 1:

Wedge# | 1 |

At step 317, the system checks to see if Wedge# (now 1) is equal to WedgeStart (1). At this point, they ARE equal and processing continues with step 319, rather than step 318.

PREPARE FOR THIRD REVOLUTION

At step 319, having just completed a second whole revolution, the system determines the average uncorrected runout value RRODC according to the formula:

RRODC=RROSum/N
RRODC=0.184/4
RRODC=0.046

The system then clears RROSum to zero in order to accumulate fresh runout values during the next revolution.

At step 320, the system decrements RevLambda (now 14) by one, i.e. RevLambda=RevLambda−1, and then checks to see if RevLambda equals zero. If RevLambda is not equal to zero, as here, then we have more revolutions to go and processing continues with step 318.

Those skilled in the art will appreciated that various adaptations and modifications of the just-described preferred embodiment can be configured without departing from the scope and spirit of the invention. Therefore, it is to be understood that, within the scope of the appended claims, the invention may be practiced other than as specifically described herein.

We claim:

1. A method for selectively correcting repeatable runout in a disk drive having a magnetic disk with a plurality of tracks that each have a cylinder address and a plurality of servo wedges, a means for rotating the magnetic disk at a rotation frequency, a transducer head mounted on an actuator, a means for moving the actuator, and a sampled servo controller for reading signals from the transducer head and for providing servo compensation signals to the actuator moving means for positioning the transducer head over the magnetic disk, the method of comprising:

determining wedge runout values for each servo wedge of each track;

comparing the wedge runout values to a predetermined threshold for identifying over-threshold wedge runout values which exceed the predetermined threshold;

storing each of the over-threshold wedge runout values;

determining that a servo wedge having an over-threshold wedge runout value is the next wedge to pass under the transducer head; and providing the over-threshold wedge runout value to the sampled servo controller.

2. A method for selectively correcting repeatable runout as defined in claim 1, wherein the over-threshold wedge runout values are stored on an unused track of the disk.

3. A method for selectively correcting repeatable runout as defined in claim 1, wherein the over-threshold wedge runout values are stored in nonvolatile memory in the disk drive.

4. A method for selectively correcting repeatable runout as defined in claim 1, wherein information indicating a track and servo wedge that corresponds to each over-threshold wedge runout values is stored along with each of the over-threshold wedge runout values.

5. A method for selectively correcting repeatable runout in a disk drive having a magnetic disk with a plurality of tracks that each have a cylinder address and a plurality of servo wedges, a means for rotating the magnetic disk at a rotation frequency, a transducer head mounted on an actuator, a means for moving the actuator, and a sampled servo controller for reading signals from the transducer head and for providing servo compensation signals to the actuator moving means for positioning the transducer head over the magnetic disk, the method of comprising:

storing wedge runout values only for each servo wedges with wedge runout values that exceed the predetermined threshold;

determining that a servo wedge having a wedge runout value that exceeds the predetermined threshold is the next wedge to pass under the transducer head; and providing the wedge runout value to the sampled servo controller.

6. A method for selectively correcting repeatable runout as defined in claim 5, wherein the wedge runout values that exceed the predetermined threshold are stored on an unusual track of the disk.

7. A method for selectively correcting repeatable runout as defined in claim 5, wherein the wedge runout values that exceed the predetermined threshold are stored in nonvolatile memory in the disk drive.

8. A method for selectively correcting repeatable runout as defined in claim 5, wherein information indicating a track and servo wedge that corresponds to each wedge runout value that exceed the predetermined threshold is stored along with each of the wedge runout values.

* * * * *